United States Patent
Sugano et al.

(10) Patent No.: US 7,409,279 B2
(45) Date of Patent: Aug. 5, 2008

(54) LANE DEPARTURE PREVENTION APPARATUS

(75) Inventors: Takashi Sugano, Kawasaki (JP); Yoshitaka Uemura, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 212 days.

(21) Appl. No.: 10/960,974

(22) Filed: Oct. 12, 2004

(65) Prior Publication Data

US 2005/0096829 A1    May 5, 2005

(30) Foreign Application Priority Data

Oct. 29, 2003   (JP) ............................. 2003-369448

(51) Int. Cl.
*G06F 19/00* (2006.01)

(52) U.S. Cl. ..................... 701/70; 701/301; 701/41; 340/465; 340/438; 340/436; 340/575

(58) Field of Classification Search ................ 701/96, 701/301, 41, 70; 303/140; 342/165; 340/988, 340/902, 903, 435, 444, 441, 465, 438, 436, 340/575; 180/403, 282; *G06F 19/00; G06G 7/76*
See application file for complete search history.

(56) References Cited

U.S. PATENT DOCUMENTS

| | | | | | |
|---|---|---|---|---|---|
| 5,432,509 | A | * | 7/1995 | Kajiwara | ..................... 340/903 |
| 6,005,492 | A | * | 12/1999 | Tamura et al. | ............... 340/937 |
| 6,038,496 | A | | 3/2000 | Dobler et al. | |
| 6,057,754 | A | * | 5/2000 | Kinoshita et al. | ............ 340/435 |
| 6,216,079 | B1 | * | 4/2001 | Matsuda | ...................... 701/70 |
| 6,411,901 | B1 | * | 6/2002 | Hiwatashi et al. | ............ 701/301 |
| 6,553,130 | B1 | | 4/2003 | Lemelson et al. | |
| 6,882,287 | B2 | * | 4/2005 | Schofield | ..................... 340/903 |
| 2003/0025597 | A1 | * | 2/2003 | Schofield | ..................... 340/435 |
| 2003/0189493 | A1 | * | 10/2003 | Klausner et al. | ............ 340/575 |
| 2004/0104555 | A1 | * | 6/2004 | Atley | .......................... 280/426 |
| 2005/0043879 | A1 | * | 2/2005 | Desens et al. | ................. 701/96 |
| 2005/0073396 | A1 | * | 4/2005 | Mills et al. | ................... 340/435 |
| 2005/0143884 | A1 | * | 6/2005 | Bihler et al. | ................... 701/36 |

FOREIGN PATENT DOCUMENTS

| | | |
|---|---|---|
| EP | 1291227 A | 3/2003 |
| JP | 2000-033860 A | 2/2000 |
| KR | 10-1998-61720 A | 10/1998 |
| KR | 10-2000-63151 A | 11/2000 |
| WO | WO-03/059680 A1 | 7/2003 |

* cited by examiner

*Primary Examiner*—Tuan C To
(74) *Attorney, Agent, or Firm*—Global IP Counselors, LLP

(57) ABSTRACT

A lane departure prevention apparatus is configured to avoid lane departure even when the driver is not focused on driving operations, in a state in which the system-operating switch is OFF. The lane departure prevention apparatus has a driver condition detection section or device for detecting that the condition of the driver which is a condition in which the driver cannot perceive that the host vehicle is tending toward departure, and a lane departure avoidance control device for setting the braking control for avoiding departure in an operable state when the system-operating switch for the driver to instruct the operation of control braking for avoiding the lane departure is OFF, the braking control for avoiding departure is OFF, and the driver condition detection section or device has detected that the condition of the driver is a condition in which the driver cannot perceive that the host vehicle is tending toward departure.

19 Claims, 10 Drawing Sheets

LANE DEPARTURE PREVENTION APPARATUS

BACKGROUND OF THE INVENTION

1. Field of the Invention

The present invention generally relates to a lane departure prevention apparatus for preventing a host vehicle from departing from a driving lane when the host vehicle is about to depart from the lane or departure seems imminent.

2. Background Information

Conventional lane departure prevention apparatuses include apparatuses for imparting yaw moment to the host vehicle by controlling the braking force to the wheel and preventing the host vehicle from deviating from the driving lane. These conventional lane departure prevention apparatuses also inform the driver that the host vehicle may possibly depart from the driving lane by providing this yaw moment in cases in which there is a possibility that the host vehicle may depart from a driving lane. For example, one such lane departure prevention apparatus is disclosed in Japanese Laid-Open Patent Publication No. 2000-33860.

The lane departure prevention apparatus is provided with an operating switch for switching the system ON and OFF. The driver can thereby select the operable state of the lane departure prevention apparatus by switching the operating-switch ON and OFF. When the driver thinks that the control for avoiding departure is not needed, the feelings of annoyance at unwanted intervention by control for departure avoidance can be eliminated by switching the operating-switch OFF.

In view of the above, it will be apparent to those skilled in the art from this disclosure that there exists a need for an improved lane departure prevention apparatus. This invention addresses this need in the art as well as other needs, which will become apparent to those skilled in the art from this disclosure.

SUMMARY OF THE INVENTION

It has been discovered that there are cases in which the attention of the driver is not focused on driving operations in a state in which the system-operating switch is OFF. For example, there are cases in which the driver has forgotten that the operating-switch is OFF and another onboard device such the hazard switch is operating. In this case, the driver is not aware that the operating-switch should be switched ON in spite of the fact that the host vehicle is tending toward departure, so the host vehicle will depart from the lane in its present state.

The present invention was contrived in view of the above-described problems. One object of the present invention is to provide a lane departure prevention apparatus that can avoid lane departure even when the driver is not focused on driving operations, in a state in which the system-operating switch is OFF.

In order to solve some of the above-described problems, the lane departure prevention apparatus of the present invention is provided with a lane departure avoidance activation section, a driver condition detection section, and a lane departure avoidance control section. The lane departure avoidance activation section is configured to be activated by a driver to conduct a braking control operation for avoiding lane departure of a host vehicle from a driving lane when the host vehicle is tending to depart from the driving lane. The driver condition detection section is configured to detect that a driver condition tending to indicate a driver may not perceive that the host vehicle is tending toward lane departure. The lane departure avoidance control section is configured to switch the braking control operation for avoiding lane departure from a non-operating state to an operable state, when the driver condition detection section detects that the driver condition is tending to indicate that the driver may not perceive that the host vehicle is tending toward lane departure.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
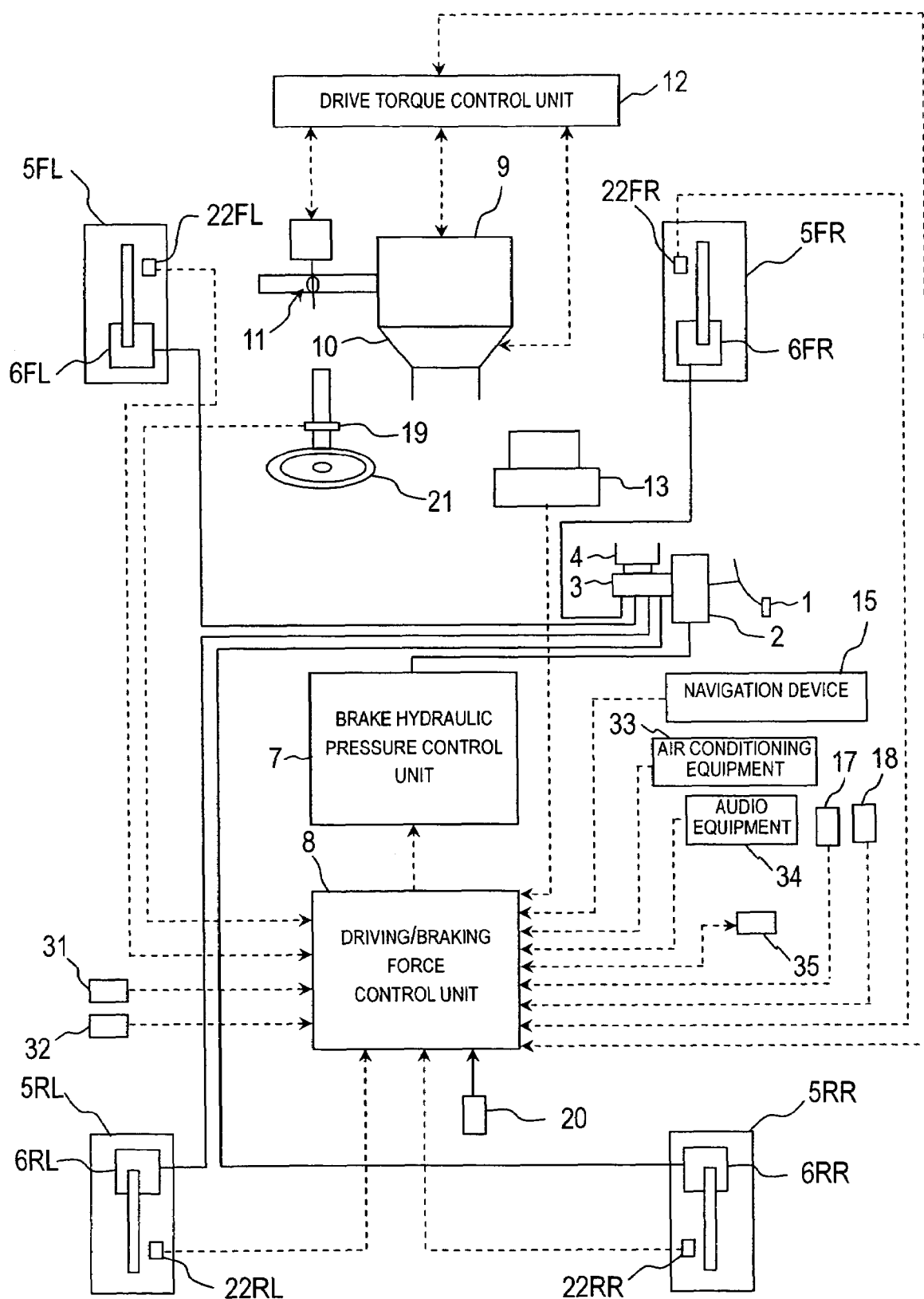
FIG. 1 is a schematic structural diagram of a vehicle equipped with a lane departure prevention apparatus in accordance a first embodiment of the present invention.

Referring initially to FIG. 1, a schematic structural diagram of a host vehicle is illustrated that is equipped with a lane departure prevention apparatus in accordance with a first embodiment of the present invention. The embodiment is a rear wheel drive vehicle equipped with the lane departure prevention apparatus of the present invention. This rear-wheel-drive vehicle is equipped with an automatic transmission and a conventional differential gear, and with a braking system that allows independent control of braking force at the front and rear wheels and the left and right wheels.

In the diagram of FIG. 1, the host vehicle is basically equipped with a brake pedal 1, a booster 2, a master cylinder 3, a reservoir 4, a pair of front wheels 5FL and 5FR, a pair of rear wheels 5RL and 5RR, a pair of front wheel cylinders 6FL and 6FR, a pair of rear wheel cylinders 6RL and 6RR, a brake hydraulic pressure control unit 7, a driving/braking force control unit 8, an internal combustion engine 9, an automatic transmission 10, a throttle valve 11, a drive torque control unit 12, an imaging unit 13, a navigation device 15, a master cylinder pressure sensor 17, a throttle aperture sensor 18, a steering angle sensor 19, a turn signal switch 20, a steering wheel 21, a pair of front wheel velocity sensors 22FL to 22FR and a pair of rear wheel velocity sensors 22RL to 22RR.

The wheel cylinders 6FL to 6RR, the brake hydraulic pressure control unit 7, the driving/braking force control unit 8 all form part of a braking apparatus that allows independent control of braking force for the front and rear wheels and the left and right wheels. The brake hydraulic pressure is boosted by the master cylinder 3 such that the brake fluid is ordinarily fed to the wheel cylinders 6FL to 6RR of the wheels 5FL to 5RR in accordance with the downward force (depression amount) exerted by the driver on the brake pedal 1. Also, the brake hydraulic pressure control unit 7 is interposed between the master cylinder 3 and the wheel cylinders 6FL to 6RR for allowing the brake hydraulic pressure of the wheel cylinders 6FL to 6RR to be individually controlled by the brake hydraulic pressure control unit 7.

The controller 8 preferably includes a microcomputer with a lane departure prevention control program that controls the wheel cylinders 6FL, 6FR, 6RL and 6RR to apply a yaw moment to the host vehicle as discussed below. The controller 8 can also include other conventional components such as an input interface circuit, an output interface circuit, and storage devices such as a ROM (Read Only Memory) device and a RAM (Random Access Memory) device. The memory circuit stores processing results and control programs such as ones for controlling the braking control operations that are run by the processor circuit. The controller 8 is operatively coupled to the above mentioned sensors in a conventional manner. The internal RAM of the controller 8 stores statuses of operational flags and various control data. The internal ROM of the controller 8 stores the programs and predetermined variables for various operations. The controller 8 is capable of selectively controlling any number of the components of the host vehicle as needed and/or desired. It will be apparent to those skilled in the art from this disclosure that the precise structure and algorithms for the controller 8 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The brake hydraulic pressure control unit 7 is preferably configured and arranged, for example, to carry out anti-skid control and traction control. The brake hydraulic pressure control unit 7 is also configured and arranged to independently control the braking hydraulic pressure of the wheel cylinders 6FL to 6RR. Thus, the brake hydraulic pressure control unit 7 is also configured so as to control the brake hydraulic pressure in accordance with a brake hydraulic pressure command value when the brake hydraulic pressure command value is input from the driving/braking force control unit 8 (described below).

The drive torque control unit 12 controls the drive torque to the rear wheels 5RL and 5RR, which are the drive wheels, by controlling the operating conditions of the engine 9, the selected gear ratio of the automatic transmission 10, and/or the throttle opening of a throttle valve 11. The drive torque control unit 12 controls the fuel injection amount and the ignition timing, and controls the operating condition of the engine 9 by simultaneously controlling the size of the throttle aperture. With this drive torque control unit 12, the value of the drive torque Tw that is used for control is output to the driving/braking force control unit 8.

The drive torque control unit 12 is also configured to independently control the drive torque of the rear wheels 5RL and 5RR. Thus, the drive torque control unit 12 is also configured to control the drive wheel torque in accordance with a drive torque command value when the drive torque command value is input from the driving/braking force control unit 8.

The imaging unit 13 has a picture processing function. The imaging unit 13 is designed to detect the position of the host vehicle in the driving lane in order to detect the lane departure tendency of the host vehicle. The imaging unit 13 is configured to pick up an image with a monocular (single-lens) camera composed of a CCD (Charge Coupled Device) camera, for example. The imaging unit 13 is preferably disposed on the front of the host vehicle.

The imaging unit 13 is preferably configured and arranged to detect white lines or other lane markers, for example, from the imaging picture of the area in front of the host vehicle. Thus, the driving lane is detected based on the detected lane markers. Furthermore, the imaging unit 13 calculates the angle (yaw angle) $\phi$ formed by the driving lane of the host vehicle and the longitudinal axis of the host vehicle, the lateral displacement X from the center of the driving lane, the driving lane curvature $\beta$, and the like based on the detected driving lane. The imaging unit 13 outputs the calculated yaw angle $\phi$, the calculated lateral displacement X, the calculated driving lane curvature $\beta$, and the like to the driving/braking force control unit 8.

The navigation device 15 is preferably configured and arranged to detect the yaw rate $\phi'$ and the lateral acceleration Xg and/or the longitudinal acceleration Yg generated in the host vehicle. The navigation device 15 outputs the detected lateral acceleration Xg, the detected longitudinal acceleration Yg, and the detected yaw rate $\phi'$ to the driving/braking force control unit 8. The navigation device 15 also outputs road information to the driving/braking force control unit 8. Preferably, the road information (i.e., host vehicle driving environment) includes information about the type of the road, such as the number of lanes and whether the road is an ordinary road or an expressway.

The master cylinder pressure sensor 17 is preferably configured and arranged to detect the output pressure of the master cylinder 3, that is, the master cylinder hydraulic pressures Pmf and Pmr. The accelerator depression or throttle aperture opening sensor 18 is preferably configured and arranged to detect the downward force on the accelerator pedal 1 or the throttle aperture opening size to output a signal indicative of the aperture size Acc. The steering angle sensor 19 is preferably configured and arranged to detect the steering angle δ of the steering wheel 21. The turn signal switch 20 is preferably configured and arranged to detect turn signal operation with a turn signal indicator. The wheel velocity sensors 22FL to 22RR are preferably configured and arranged to detect the rotational velocity of the wheels 5FL to 5RR, that is, the so-called wheel velocity Vwi (i=fl, fr, rl, rr). Here, the hazard switch 31 is provided for switching between hazard lighting and non-lighting in accordance with the intention of the driver. All of these detection signals detected by these sensors or the like are output to the driving/braking force control unit 8.

When there is left or right directionality in the detected driving condition or state data of the host vehicle, the two directions are set such that the left direction is the positive direction. In other words, the yaw rate φ', the longitudinal acceleration Yg, and the yaw angle φ are positive values when turning left, and the lateral displacement X is a positive value when shifting from the center of the driving lane to the left.

The driving/braking force control unit 8 is configured so as to control the components constituting the vehicle. In other words, the driving/braking force control unit 8 is configured so as to control each of the components on the basis of signals or the like input from sensors and other components as described above. More specifically, control by the driving/braking force control unit 8 includes control for preventing the vehicle from departing from the driving lane when the vehicle is tending toward departure from the driving lane. Thus, the system for avoiding departure is composed of the driving/braking force control unit 8. Here, a system-operating switch 32 is provided to the vehicle for switching such a system ON and OFF. The driver can thereby enable such a lane departure-avoiding system to operate by turning the system-operating switch 32 to the ON position, and can disable the lane departure-avoiding system by turning the system-operating switch 32 to the OFF position.

In other words, the lane departure prevention apparatus of the present invention sets the braking control for avoiding departure in an operable state when the braking control for avoiding the lane departure with the lane departure avoidance activation section or device is in a non-operating state, and the driver condition detection section or device detects that the condition of the driver is a condition in which the driver cannot perceive that the host vehicle is tending toward departure.

The lane departure prevention apparatus of the present invention is thereby configured such that the braking control for avoiding host vehicle departure operates when the host vehicle is tending toward departure even when the braking control for avoiding the lane departure with the lane departure avoidance activation section or device is in a non-operating state, and the driver condition detection section or device detects that the condition of the driver is a condition in which the driver cannot perceive that the host vehicle is tending toward departure.

According to the present invention, the lane departure prevention apparatus can prevent lane departure even in a state in which the braking control for avoiding the lane departure with the lane departure avoidance activation section or device is in a non-operating state, and the condition of the driver is a condition in which the driver cannot perceive that the host vehicle is tending toward departure.

Air conditioning equipment 33 and audio equipment 34 are also provided to the vehicle. The driver can operate the air conditioning equipment 33 to adjust the temperature inside the car, and operate the audio equipment 34 to play music inside the car.

A warning sound output unit 35 is also provided to the vehicle. The warning sound output unit 35 is configured to be driven by a drive signal from driving/braking force control unit 8. The drive timing and other facets of the warning sound output unit 35 are described in detail later.

Next, a computational processing procedure performed by the driving/braking force control unit 8 for avoiding lane departure will now be described below with reference to FIG. 2. This computational processing is executed by using a timer interrupt at each specific predetermined sampling time interval ΔT, such as every 10 msec for example. Communication processing is not included in the processing shown in FIG. 2, but the information obtained by computational processing is updated and stored in random access memory, and required information is read out from the random access memory when required.

First, in step S1, various kinds of data are read from the above-described sensors, by the driving/braking force control unit 8. More specifically, the following types of data are read: the lateral acceleration Xg, the longitudinal acceleration Yg, the yaw rate φ', and the road information obtained by the navigation device 15; the wheel velocity Vwi; the steering angle δ; the accelerator depression amount or throttle opening aperture size Acc; the master cylinder hydraulic pressures Pmf and Pmr; the turn switch signal WS from the turn signal switch 20; the signal for the hazard switch 31; the drive torque Tw from the drive torque control unit 12; and the yaw angle φ, the lateral displacement X, and the driving lane curvature β from the imaging unit 13.

In the subsequent step S2, a determination is made as to whether the system-operating switch 32 is ON. When the system-operating switch 32 is ON, the system advances to step S5, and when the system-operating switch 32 is OFF, the system advances to step S3.

In step S3, a determination is made as to whether the hazard switch 31 has been ON for a predetermined period of time $T_H$. The determination is made based on a signal from the hazard switch 31, for example. When the hazard switch 31 has been ON for a predetermined period of time $T_H$, the system advances to step S4, and when the hazard switch 31 has not been ON for a predetermined period of time $T_H$, processing is performed again from step S1.

In step S4, the system-operating switch 32 is forcibly switched ON. The system then advances to step S5.

Next, the processing moves to step S5 where, the host vehicle velocity V is calculated based on the average value of the wheel velocities of the non-driven wheels. In the illustrated embodiment, the host vehicle is driven by the rear wheels, so the host vehicle velocity V is calculated based on the velocities $Vw_{FL}$ and $Vw_{FR}$ of the front left and right wheels 5FL and 5FR. In any case, the host vehicle velocity V is calculated using one of the Equations (1) as shown below, based on the wheel velocity Vwi of the non-driven wheels that was read in the above-described step S1.

$V=(Vwrl+Vwrr)/2$ for front wheel drive, and $V=(Vwfl+Vwfr)/2$ for rear wheel drive  (1)

In Equation (1), the terms Vwfl and Vwfr are the respective wheel velocities of the left and right front wheels, and the terms Vwrl and Vwrr are the respective wheel velocities of the left and right rear wheels. In other words, in Equation (1), the host vehicle velocity V is calculated as the average value of the wheel speed of the driven wheels. In the present embodiment, the host vehicle is driven by the rear wheels, so the host vehicle velocity is calculated from the latter equation, i.e., based on the wheel velocity of the front wheels 5FL and 5FR.

Also, the host vehicle velocity V calculated in this manner is preferably used during normal-driving. In other words, when the ABS (Anti-lock Brake System) control or the like is operating, for example, the estimated car body velocity that is estimated in the ABS control is used as the above-described vehicle velocity V. The value being used for the navigation information in the navigation device 15 can also be used as the above-described vehicle velocity V.

Figure 3:
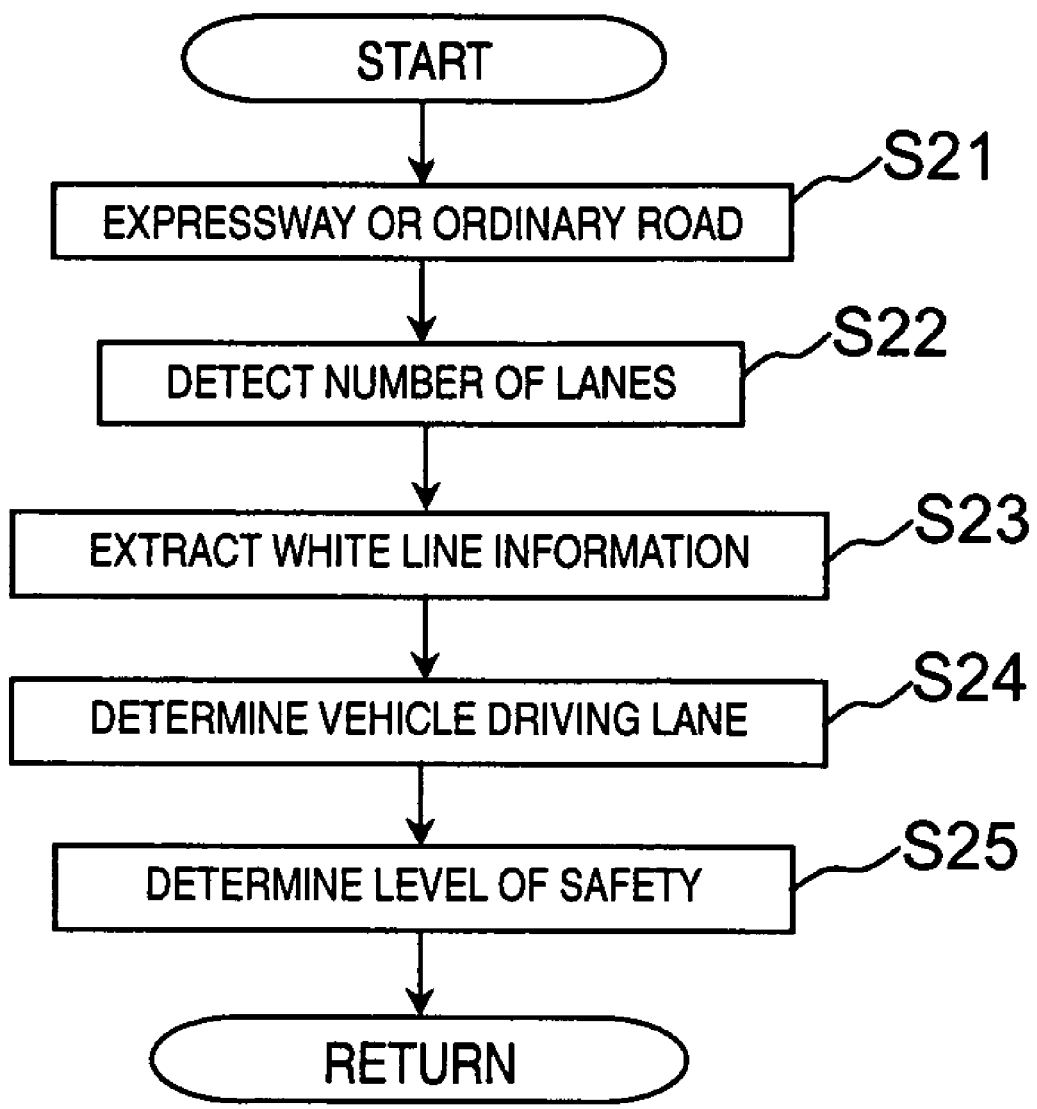
FIG. 3 is a flowchart showing the processing content for determining the driving environment by the driving/braking force control unit.

The host vehicle driving environment is determined in the following step S6. More specifically, the type of road on which the host vehicle is traveling and the driving lane of the host vehicle are detected as the driving environment. The direction based on the level of safety is then determined from the detected results. The determination is made based on the video information from the imaging unit 13 and on the road information from the navigation device 15. In other words, the determination of the driving environment is made based on the number of lanes and the road-type information that indicates whether the road is an ordinary road or an expressway. FIG. 3 shows the specific processing procedure for determining the driving environment.

First, in step S21, the type of road (ordinary road or expressway) currently being traveled is acquired from the road information provided by the navigation device 15. Furthermore, in step S22, the number of lanes of the road currently being traveled is acquired from the road information provided by the navigation device 15.

Figure 4:
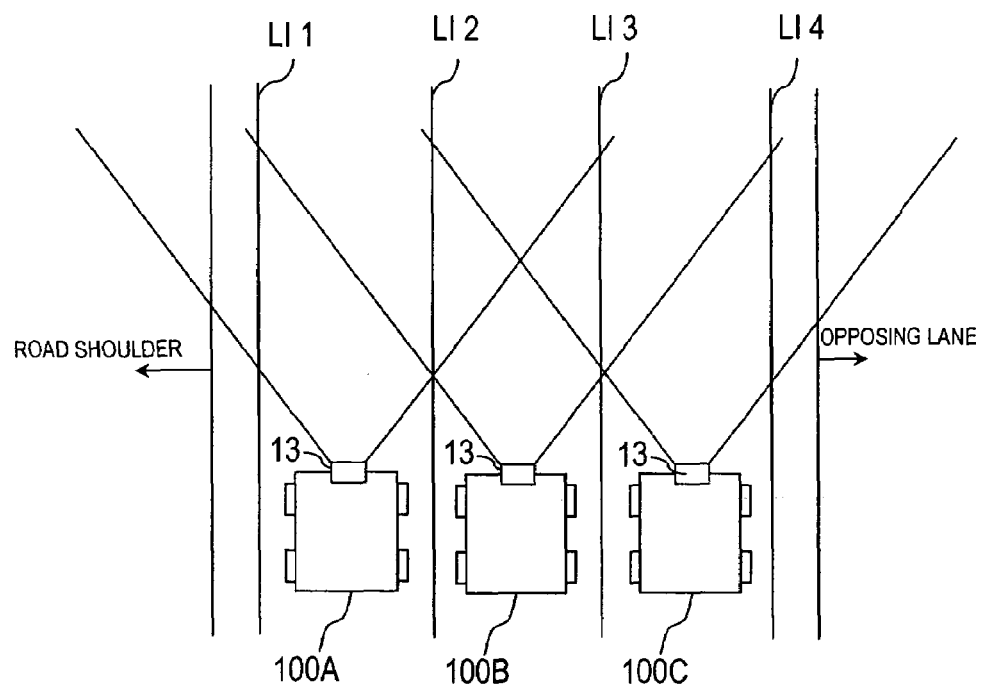
FIG. 4 is a diagram showing vehicles traveling on a three-lane, one-way road.

In the subsequent step S23 the white line portion (lane-dividing line portion) is extracted from the imaging picture taken by the imaging unit 13. Here, an example is described for the case in which the host vehicle is traveling along a three-lane, one-way road, as shown in FIG. 4. The road, by being partitioned from the left-hand side by first to fourth white lines LI 1, LI 2, LI 3, and LI 4, is configured as a three-lane, one-way road, as shown in FIG. 4. When the host vehicle is traveling along such a road, the imaging picture obtained for each lane is different. Furthermore, a picture composed of white lines extracted from the picture also differs in accordance with the driving lane.

Figure 5:
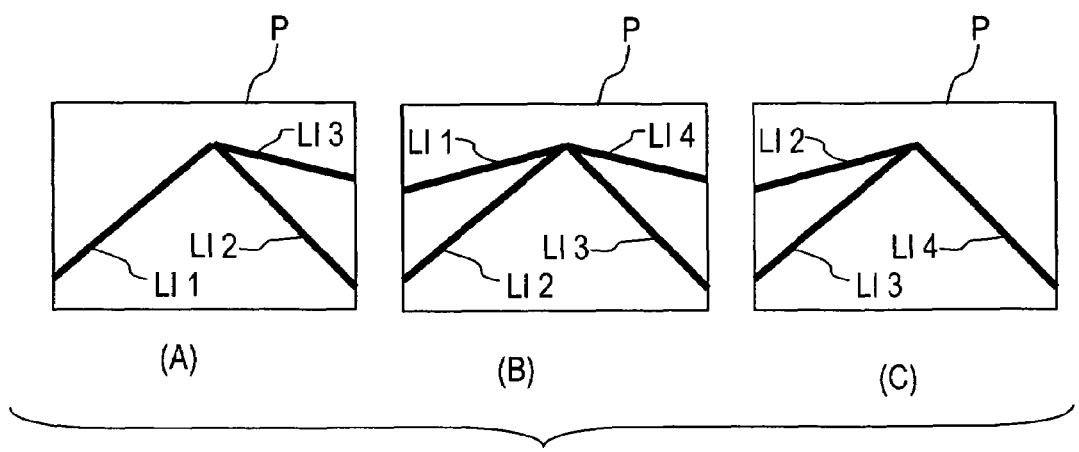
FIG. 5 is a diagram showing an imaging picture taken by the host vehicle in each lane position when the host vehicle is traveling on a three-lane, one-way road.

In other words, when the host vehicle 100A is traveling in the left-hand lane in the traveling direction, the imaging picture P taken by the imaging unit 13 of the host vehicle 100A is a unique picture mainly comprising first, second, and third white lines LI1, LI2, and LI3, as shown in picture (A) of FIG. 5. Also, when the host vehicle 100B is traveling in the center lane, the imaging picture P taken by the imaging unit 13 of the host vehicle 100B is a unique picture mainly comprising first, second, third, and fourth white lines LI1, LI2, LI3, and LI4, as shown in picture (B) of FIG. 5. When the host vehicle 100C is traveling in the right-hand lane in the traveling direction, the imaging picture P taken by the imaging unit 13 of the host vehicle 100C is a unique picture mainly comprising second, third, and fourth white lines LI 2, LI 3, and LI 4, as shown in picture (C) of FIG. 5. Thus, the configuration of the white lines in the picture differs in accordance with the driving lane.

The host vehicle driving lane is determined in the subsequent step S24. More specifically, the host vehicle driving lane is determined based on the information obtained in steps S22 and S23. In other words, the host vehicle driving lane is determined based on the number of lanes in the road currently being traveled by the host vehicle and the imaging picture (picture with the white lines extracted) taken by the imaging unit 13. For example, the picture obtained in accordance with the number of lanes and the driving lane is stored in advance as picture data, the picture data prepared in advance is compared with the number of lanes in the road currently being traveled by the host vehicle and the current imaging picture (picture with the white lines extracted) taken by the imaging unit 13, and the host vehicle driving lane is determined.

The level of safety in the transverse direction viewed from the lane in which the host vehicle is driving is determined in the subsequent step S25. More specifically, the direction in which the level of safety is low is stored as information when the host vehicle has departed from the lane. Therefore, when the level of safety is low in the left-hand direction, as viewed from lane in which the host vehicle is traveling, this direction is stored as the direction (hereinafter referred to as "the obstacle-containing direction") $S_{out}$ in which the level of safety is low ($S_{out}$=left). When the level of safety is low in the right-hand direction, as viewed from lane in which the host vehicle is traveling, this direction is stored as the obstacle-containing direction $S_{out}$ ($S_{out}$=right). This is determined as follows, for example.

In FIG. 4, for example, when the host vehicle 100A is traveling in the left-hand lane, the level of safety is lower when the host vehicle departs in the left-hand direction from the left-hand lane than when the host vehicle departs in the right-hand direction from the left-hand lane. This is because the road shoulder is in the left-hand direction from the left-hand lane, and there is a high possibility that the road shoulder is a wall, guardrail, obstacle, or cliff. Hence, when the host vehicle 100A is traveling in the left-hand lane, it is determined that the left-hand direction is the obstacle-containing direction $S_{out}$ ($S_{out}$=left).

When the host vehicle 100B is traveling in the center lane, the level of safety is the same in both the left and right directions with respect to the current driving lane because the host vehicle 100B would still be on the road were departure to occur in either direction.

When the host vehicle 100C is traveling in the right-hand lane, the level of safety is lower when the host vehicle departs in the right-hand direction, to the opposing lane than when the host vehicle departs in the left-hand direction to the neighboring lane. Hence, in this case, when the host vehicle 100C is traveling in the right-hand lane, it is determined that the right-hand direction is the obstacle-containing direction $S_{out}$ ($S_{out}$=right).

In comparison with expressways, ordinary roads have a narrower road shoulder width, there are many obstacles on the road shoulder, and pedestrians are also present. For this reason, the level of safety is lower for departure toward the road shoulder on an ordinary road than when the host vehicle departs toward the road shoulder on an expressway.

Comparing the number of lanes, the level of safety is lower when the left-hand direction is the road shoulder, and one side of the road is a single lane in which the right-hand direction is the opposing lane. In this case, it is determined that both the left and right directions are an obstacle-containing direction $S_{out}$ ($S_{out}$=both).

Most two-lane, two-way roads, for example, do not have a median strip, a guardrail or another divider, so the imaging picture when the host vehicle is traveling on the two-lane, two-way road is one such as that shown in the picture (A) of FIG. 5 for countries that drive on the left side of the road and such as that shown in the picture (C) of FIG. 5 for countries that drive on the right side of the road. In other words, the imaging picture when the host vehicle is traveling on a two-lane, two-way road is the same imaging picture taken by the imaging unit 13 of the host vehicle 100A traveling in the left-hand lane of a three-lane road for countries that drive on the left side of the road. Hence, assuming that both ordinary roads and expressways are traveled, the obstacle-containing direction $S_{out}$ cannot be determined solely by using an imaging picture. Based on this fact, the number of lanes in the road on which the host vehicle is currently traveling is obtained from the navigation device 15, and by making a determination as to whether the road currently being traveled is two-lane, two-way road or a three-lane, one-way road, it can be determined that the level of safety is low in the right-hand direction as well when a two-lane, two-way road is being traveled.

Figure 2:
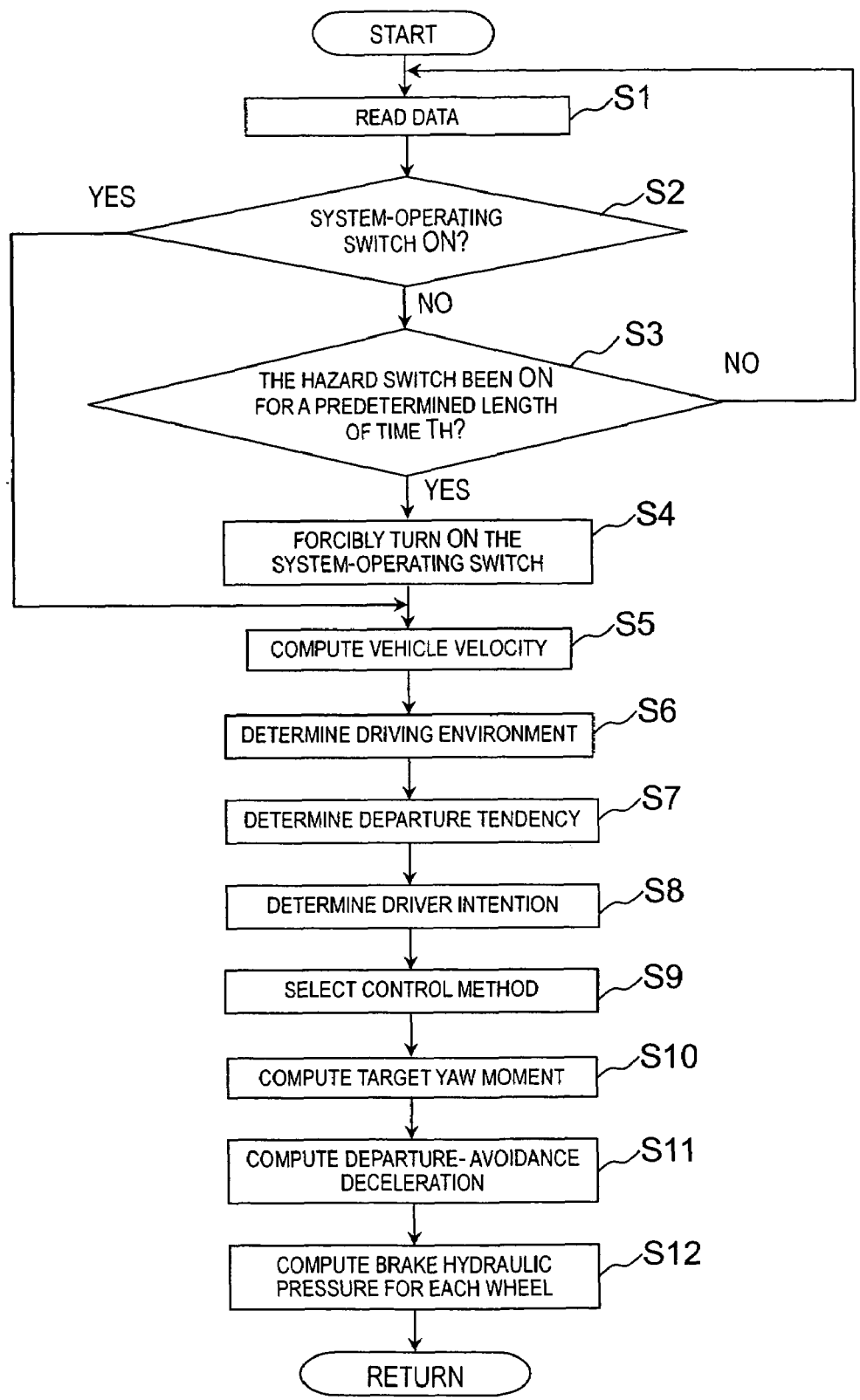
FIG. 2 is a flowchart showing the processing content of a driving/braking force control unit as a component of the lane departure prevention apparatus.

The evaluation of the driving environment in step S6 shown in FIG. 2 is performed with the processing procedure shown in FIG. 3 described above.

Determination of the lane departure tendency is performed in the subsequent step S7. The processing procedure for processing this determination is specifically shown in FIG. 6.

Figure 7:
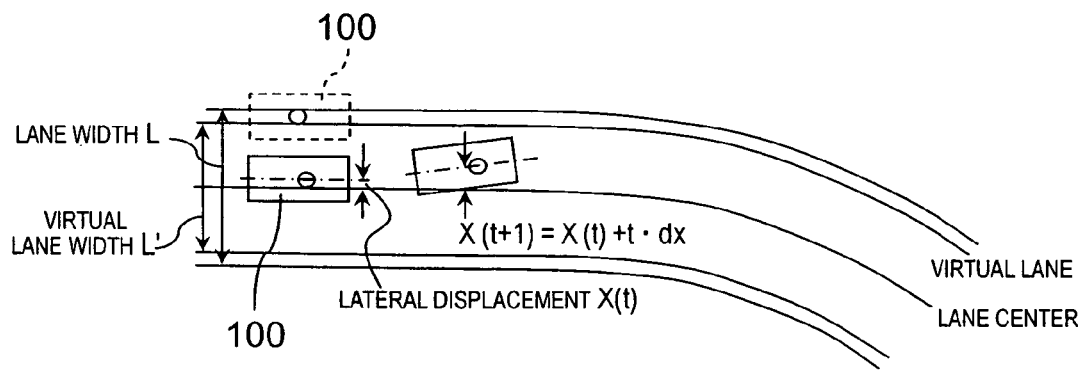
FIG. 7 is a diagram used for describing the estimated time of departure $T_{out}$.

First, the estimated time of departure $T_{out}$ is calculated in step S31. More specifically, the estimated time of departure $T_{out}$ is calculated with Equation (2) shown below by designating dx as the amount of variation (amount of variation per unit time) of the lateral displacement X, designating L as the lane width, and using the lateral displacement X (see, FIG. 7 for the values of X, dx, and L).

$$T_{out}=(L/2-X)/dx \quad (2)$$

The estimated time of departure $T_{out}$ until the host vehicle 100 laterally displaced by an amount equal to the lateral displacement X from the center of the lane (X=0) arrives at an externally positioned area (road shoulder, for example) separated by an amount equal to the distance L/2 from the center of the lane can be computed with Equation (2). The lane width L is obtained from the imaging picture processed by the imaging unit 13. The position of the host vehicle can also be obtained from the navigation device 15, and the lane width L can be obtained from the map data stored in the navigation device 15.

The lane departure determination flag is set in the subsequent step S32. More specifically, the estimated time of departure $T_{out}$ is compared with a predetermined first departure-determining threshold Ts. Here, when the host vehicle moves away from the center of the lane and when the estimated time of departure $T_{out}$ is less than the first departure-determining threshold Ts ($T_{out}$<Ts), the lane departure determination flag $F_{out}$ is switched ON ($F_{out}$=ON) by the processing of step S32. In other words, it is determined that lane departure will occur (lane departure tendency exists), and the lane departure determination flag $F_{out}$ is set to ON ($F_{out}$=ON). When the host vehicle is in a state in which $F_{out}$=ON and returns to the center side of the lane, then the estimated time of departure $T_{out}$ is equal to or greater than the first departure-determining threshold Ts ($T_{out}$≧Ts), and the lane departure determination flag $F_{out}$ is switched OFF ($F_{out}$=OFF). In other words, it is determined that departure will not occur (departure tendency does not exist) when the estimated time of departure $T_{out}$ is equal to or greater than the first departure-determining threshold Ts ($T_{out}$≧Ts). When a lane departure tendency exists and, for example, if braking control (described hereinafter) is performed for avoiding lane departure, or if the driver himself takes evasive actions, then the lane departure determination flag $F_{out}$ is switched from ON to OFF.

The first departure-determining threshold Ts is variable. In other words, the first departure-determining threshold Ts can also be set, for example, based on the level of safety obtained in step S6.

The lane departure direction $D_{out}$ is subsequently determined based on the lateral displacement X in the step S33. More specifically, when the host vehicle is laterally displaced from the center of the lane in the left-hand direction, then that direction is set as the lane departure direction $D_{out}$ ($D_{out}$=left). When the host vehicle is laterally displaced from the center of the lane in the right-hand direction, then that direction is set as the lane departure direction $D_{out}$ ($D_{out}$=right).

The lane departure tendency is determined in step S7 as described above.

The intention of the driver to change lanes is determined in the subsequent step S8. More specifically, the intention of the driver to change lanes is determined as follows based on the steering angle δ and/or the turn switch signal obtained in step S1.

When the direction (lighted blinker side) indicated by the turn switch signal and the direction indicated by the lane departure direction $D_{out}$ obtained in step S7 are the same, it is determined that the driver is intentionally changing lanes, and the lane departure determination flag $F_{out}$ is changed to OFF ($F_{out}$=OFF). In other words, the determination result is changed, indicating that departure will not occur or no departure is imminent.

When the direction (lighted blinker side) indicated by the turn switch signal and the direction indicated by departure direction $D_{out}$ obtained in step S7 are different, the lane departure determination flag $F_{out}$ is maintained, and the lane departure determination flag $F_{out}$ is left ON ($F_{out}$=ON). In other words, the determination result is maintained, indicating that departure will occur or is imminent.

When the turn signal switch 20 has not been operated, the driver intention to change lanes is determined based on the steering angle δ. In other words, in the case that the driver steers in the lane departure direction, it is determined that the driver is intentionally changing lanes when the steering angle δ and the amount of variation Δδ (amount of variation per unit time) in the steering angle are equal to or greater than a set value, and the lane departure determination flag $F_{out}$ is changed to OFF ($F_{out}$=OFF).

The control method for departure avoidance is selected in the subsequent step S9. More specifically, a determination is made as to whether or not to issue a lane departure alarm and/or to perform departure-avoiding braking control. The braking control method is selected when the lane departure-avoiding braking control is performed.

A warning is sounded from the warning sound output unit 35, for example, in accordance with the ON and OFF state of the lane departure determination flag $F_{out}$ obtained in step S8. For example, the lane departure determination flag $F_{out}$ is ON ($T_{out}$<Ts), and a warning is sounded from the warning sound output unit 35 when it can be determined that lane departure can be prevented by the driver performing a steering operation or the like.

As described herein, situations exist in which the lane departure determination flag $F_{out}$ is ON ($T_{out}$<Ts) but it can nevertheless be determined that lane departure can be prevented by the driver performing a steering operation or the like. For example, those situations include ones in which the driver himself realizes the lane departure tendency of the host vehicle, and then takes evasive actions, but the lane departure determination flag $F_{out}$ itself is still ON ($T_{out}$<Ts).

In the case that the lane departure determination flag $F_{out}$ is ON ($T_{out}$<Ts), the braking control method is also selected based on the obstacle-containing direction $S_{out}$ obtained in step S6 and the lane departure direction $D_{out}$ obtained in step S7. The procedure is described in detail hereinafter.

The target yaw moment generated in the host vehicle is calculated in the subsequent step S10. This target yaw moment is a yaw moment imparted to the host vehicle for departure avoidance. More specifically, the target yaw moment Ms is calculated with Equation (3) below based on the amount of variation dx and the lateral displacement X obtained in step S1.

$$Ms = K1 \cdot X + K2 \cdot dx \qquad (3)$$

Figure 8:
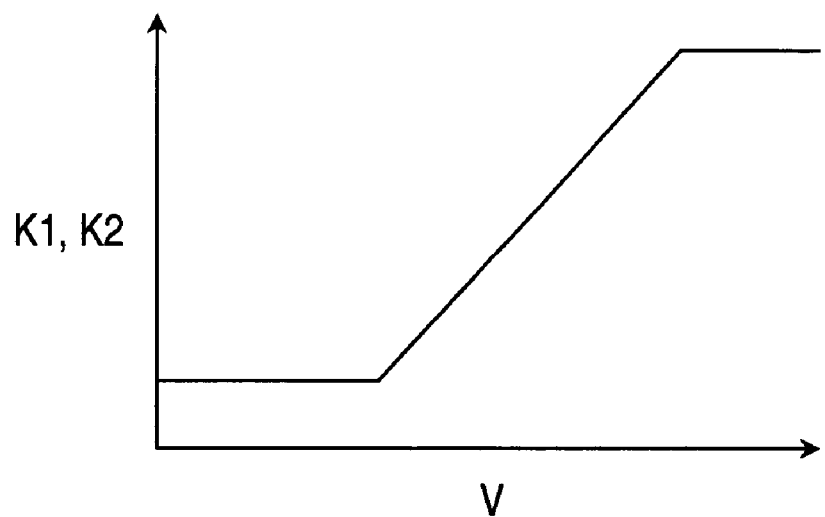
FIG. 8 is a characteristics diagram showing the characteristics of gains K1 and K2 that are used for calculating the yaw moment Ms.

In Equation (3), the terms K1 and K2 are the gains that vary or fluctuate in accordance with the host vehicle velocity V. For example, in FIG. 8, the gains K1 and K2 have lower values at low speeds, increase in a corresponding relationship with the host vehicle velocity V when the host vehicle velocity V reaches a certain value, and remain constant thereafter when a certain vehicle velocity V is reached.

The lane departure-avoiding deceleration is calculated in the subsequent step S11. In other words, the braking force applied to both the left and right wheels is calculated with the aim of decelerating the host vehicle. Here, such a braking force is calculated as target brake hydraulic pressures Pgf and Pgr applied to both the left and right wheels. The target brake hydraulic pressure Pgf for the front wheels is calculated with Equation (4) below.

$$Pgf = Kgv \cdot V + Kgx \cdot dx \qquad (4)$$

Figure 9:
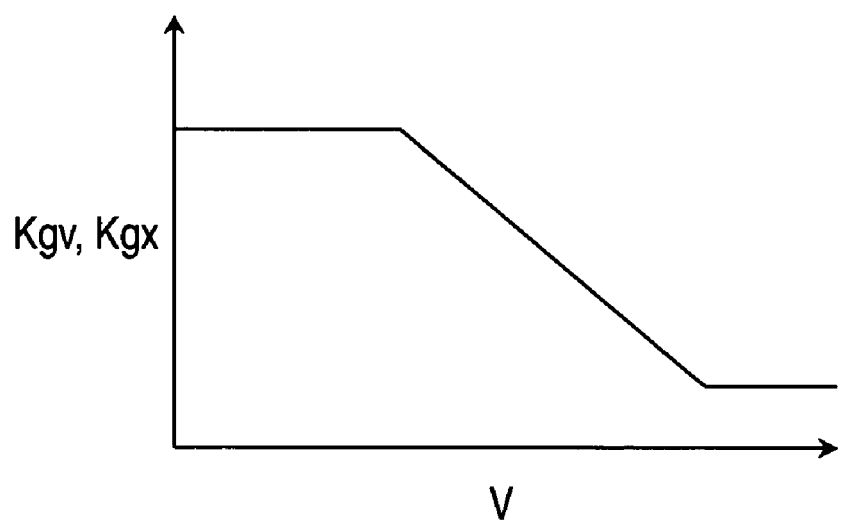
FIG. 9 is a characteristics diagram showing the characteristics of conversion factors Kgv and Kgx that are used for calculating the target brake hydraulic pressure Pgf.

In Equation (4), the terms Kgv and Kgx are conversion factors for converting the braking force into brake hydraulic pressure. The conversion factors Kgv and Kgx are respectively set based on the host vehicle velocity V and the amount of variation dx. For example, in FIG. 9 the conversion factors Kgv and Kgx have higher values at low speeds, decrease in a corresponding relationship with the host vehicle velocity V when the host vehicle velocity V reaches a certain value, and remain constant thereafter when a certain vehicle velocity V is reached.

The target brake hydraulic pressure Pgr is calculated for the rear wheels based on the target brake hydraulic pressure Pgf for the front wheels while taking the front and rear braking distribution into consideration.

The deceleration (more specifically, the target brake hydraulic pressure Pgf and Pgr) for departure avoidance is obtained in this manner in step S11.

The target brake hydraulic pressure for each wheel is calculated in the subsequent step S12. In other words, the final brake hydraulic pressure is calculated based on the presence of departure-avoiding braking control. More specifically, the calculation is performed in the following manner.

(1) When the lane departure determination flag $F_{out}$ is OFF ($F_{out}$=OFF), i.e., when it is determined that departure will not occur, the target brake hydraulic pressure Psi (i=fl, fr, rl, rr) for each wheel is set as the master cylinder hydraulic pressure Pmf or Pmr, as shown in Equations (5) and (6) below.

$$Psfl = Psfr = Pmf \qquad (5)$$

$$Psrl = Psrr = Pmr \qquad (6)$$

In Equations (5) and (6), the term Pmf is the master cylinder hydraulic pressure for the front wheels, while the term Pmr is the master cylinder hydraulic pressure for the rear wheels. The rear wheel master cylinder hydraulic pressure Pmr is a value calculated based on the master cylinder hydraulic pressure Pmf for the front wheels while taking the front and rear braking distribution into consideration.

(2) When the lane departure determination flag $F_{out}$ is ON ($F_{out}$=ON), i.e., when it is determined that departure will occur, the front wheel target brake hydraulic pressure difference $\Delta$Psf and the rear wheel target brake hydraulic pressure difference $\Delta$Psr are first calculated based on the target yaw moment Ms. More specifically, the target brake hydraulic pressure differences $\Delta$Psf and $\Delta$Psr are calculated with Equations (7) to (10) below.

When Ms<Ms1, then $$\Delta Psf = 0 \qquad (7)$$

$$\Delta Psr = 2 \cdot Kbr \cdot Ms/T \qquad (8)$$

When Ms$\geq$Ms1, then $$\Delta Psf = 2 \cdot Kbf \cdot (Ms - Ms1)/T \qquad (9)$$

$$\Delta Psr = 2 \cdot Kbr \cdot Ms1/T \qquad (10)$$

In Equations (7) to (10), the term Ms1 is the threshold used for setting purposes, while the term T is the tread. The tread T is the same value for simplicity. The terms Kbf, and Kbr are conversion factors for the front and rear wheels when the braking force is converted to brake hydraulic pressure, and are set according to brake parameters or specifications.

The braking force applied to the wheels is thus distributed in accordance with the magnitude of the target yaw moment Ms. That is to say, when the target yaw moment Ms is less than the threshold Ms1 used for setting purposes, the front wheel target brake hydraulic pressure difference $\Delta$Psf is set to 0, a predetermined value is assigned to the rear wheel target brake hydraulic pressure difference $\Delta$Psr, and the braking force difference is generated in the left and right rear wheels. When the target yaw moment Ms is equal to or greater than the threshold Ms1 used for setting purposes, a predetermined value is assigned to the target brake hydraulic force differences $\Delta$Psf and $\Delta$Psr, and the braking force difference is generated in the front and rear left and right wheels.

When the lane departure determination flag $F_{out}$ is ON ($F_{out}$=ON), the final target brake hydraulic pressure Psi (i=,fl, fr, rl, rr) for each wheel is calculated using the target brake hydraulic pressure differences $\Delta$Psf and $\Delta$Psr and the target brake hydraulic pressures Pgf and Pgr calculated as described above. More specifically, the final target brake hydraulic pressure Psi (i=fl, fr, rl, rr) for each wheel is calculated based on the braking control method selected in step S9.

The braking control method selected in step S9 will now be described.

In step S9, when the lane departure determination flag $F_{out}$ is ON, the braking control method is selected based on the obstacle-containing direction $S_{out}$ and the lane departure direction $D_{out}$. First, the braking control method selected based on the obstacle-containing direction $S_{out}$ and the lane departure direction $D_{out}$ when the lane departure determination flag $F_{out}$ is ON will be described below for various relationships between the obstacle-containing direction $S_{out}$ and the lane departure direction $D_{out}$ (first case to third case).

In the first case, when the obstacle-containing direction $S_{out}$ and the lane departure direction $D_{out}$ do not match, the braking control (hereinafter referred to as "departure-avoiding yaw control") is carried out so that a yaw moment is imparted to the host vehicle for avoiding departure until the lane departure determination flag $F_{out}$ is OFF.

Here, the magnitude of the yaw moment imparted to the host vehicle in order to avoid departure is the target yaw moment Ms. The yaw moment is imparted to the host vehicle by creating a difference in the braking force applied to the left and right wheels. More specifically, when the target yaw moment Ms is less than the threshold Ms1 used for setting purposes, a braking force difference is generated in the left and right rear wheels to impart the target yaw moment Ms to the host vehicle. When the target yaw moment Ms is equal to or greater than the threshold Ms1 used for setting purposes, a braking force difference is generated in the front and rear left and right wheels to impart the target yaw moment Ms to the host vehicle, as described above.

The lane departure determination flag $F_{out}$ is switched from ON to OFF in cases in which departure-avoiding braking control has been carried out or the driver himself has taken evasive actions when there is a lane departure tendency.

In the second case, when there is a match between the obstacle-containing direction $S_{out}$ and the lane departure direction $D_{out}$ and the road type R obtained in step S6 is an ordinary road, the lane departure-avoiding yaw control is carried out until the lane departure determination flag $F_{out}$ is OFF.

Furthermore, the second departure-determining threshold Tr, which is less than the first departure-determining threshold Ts (Ts>Tr>0), is defined. When the estimated time of departure $T_{out}$ becomes less than the second departure-determining threshold Tr ($T_{out}$<Tr), the lane departure-avoiding yaw control is applied, and the braking control for decelerating the host vehicle (hereinafter referred to as "departure-avoiding deceleration control") is carried out. The lane departure-avoiding deceleration control is carried out so as to provide substantially equal braking force to both the left and right wheels.

Here, the estimated time of departure $T_{out}$ is an indicator of the magnitude of the lane departure tendency, so an estimated time of departure that is less than the second departure-determining threshold Tr corresponds to the lane departure tendency being greater than the second threshold.

In the third case, when there is a match between the obstacle-containing direction $S_{out}$ and the lane departure direction $D_{out}$ and the road type R obtained in step S6 is an expressway, the lane departure-avoiding yaw control is carried out until the lane departure determination flag $F_{out}$ is OFF.

Furthermore, in this third case, when the estimated time of departure $T_{out}$ has reached 0, the lane departure-avoiding yaw control is applied, and the lane departure-avoiding deceleration control is carried out.

In the third case, the lane departure-avoiding deceleration control can also be carried out when the estimated time of departure $T_{out}$ has become less than the second departure-determining threshold Tr, in the same manner as in the second case. In this case, when the estimated time of departure $T_{out}$ becomes 0, for example, the deceleration of the host vehicle is increased by departure-avoiding deceleration control. Therefore, the lane departure-avoiding deceleration control is configured so as to be actuated when the estimated time of departure $T_{out}$ has become less than the second departure-determining threshold Tr, and when the estimated time of departure $T_{out}$ becomes 0. When the estimated time of departure $T_{out}$ becomes 0 in this case, the deceleration of the host vehicle is further increased.

The braking control methods are selected in step S9 in accordance with the obstacle-containing direction $S_{out}$ and the lane departure direction $D_{out}$ in this manner. In other words, the braking control method for departure avoidance is selected by departure-avoiding yaw control alone or by a combination of the lane departure-avoiding yaw control and the lane departure-avoiding deceleration control in accordance with the obstacle-containing direction $S_{out}$ and the lane departure direction $D_{out}$ and/or in accordance with the host vehicle velocity V and the estimated time of departure $T_{out}$.

The target brake hydraulic pressure Psi (i=fl, fr, rl, rr) for each wheel is calculated in step S12 in accordance with each type of braking control method.

In the lane departure-avoiding yaw control for the first to third cases, for example, the target brake hydraulic pressure Psi (i=fl, fr, rl, rr) for each wheel is calculated with Equations (11) below.

$$Psfl=Pmf$$

$$Psfr=Pmf+\Delta Psf$$

$$Psrl=Pmr$$

$$Psrr=Pmr+\Delta Psr \quad (11)$$

The lane departure-avoiding yaw control and the lane departure-avoiding deceleration control are carried out in the second and third cases, but in this case the target brake hydraulic pressure Psi (i=fl, fr, rl, rr) for each wheel is calculated with Equations (12) below.

$$Psfl=Pmf+Pgf/2$$

$$Psfr=Pmf+\Delta Psf+Pgf/2$$

$$Psrl=Pmr+Pgr/2$$

$$Psrr=Pmr+\Delta Psr+Pgr/2 \quad (12)$$

Also, the target brake hydraulic pressure Psi (i=fl, fr, rl, rr) for each wheel is calculated with reference to the deceleration action taken by the driver. In other words, the master cylinder hydraulic pressures Pmf and Pmr are applied, as shown in Equations (11) and (12).

The above describes the processing for step S12. Thus, the target brake hydraulic pressure Psi (i=fl, fr, rl, rr) for each wheel is calculated based on the state of the lane departure determination flag $F_{out}$ in step S12. When the lane departure determination flag $F_{out}$ is ON, the target brake hydraulic pressure Psi (i=fl, fr, rl, rr) for each wheel is calculated in accordance with the braking control methods selected in step S9 in response to the relationship between the first obstacle-containing direction $S_{out}$ and the lane departure direction $D_{out}$.

Described above is the computational processing performed by the driving/braking force control unit 8. With the driving/braking force control unit 8, the target brake hydraulic pressure Psi (i=fl, fr, rl, rr) calculated for each wheel in step S12 is output to the brake hydraulic pressure control unit 7 as a brake hydraulic pressure command value.

The lane departure prevention apparatus described above operates according to the following overview.

First, various kinds of data are read from the sensors, the controllers, and the control units (step S1).

The operating states of the system-operating switch 32 and hazard switch 31 are determined (steps S2 and S3). Here, when the system-operating switch 32 is ON, or when the system-operating switch 32 is OFF but the hazard switch 31 has been ON for predetermined length of time $T_H$, the system advances to processing in a later step (processing in step S5 and thereafter); and when the system-operating switch 32 is OFF and the hazard switch 31 has not been ON for a predetermined length of time $T_H$, processing is carried out again from the beginning (processing in step S1).

When the system-operating switch 32 is OFF but the hazard switch 31 has been ON for a predetermined length of time $T_H$, the system-operating switch 31 is forcibly switched ON when advancing to processing in a later step (step S4).

When the system-operating switch 32 is ON, or when the system-operating switch 32 is OFF but the hazard switch 31 has been ON for a predetermined length of time $T_H$, the vehicle velocity V is calculated (step S5) in the first processing thereafter.

Next, in step S6, the driving environment is determined and the direction (obstacle-containing direction $S_{out}$) in which the safety level is low is selected (see FIG. 3). For example, when the host vehicle 100A is traveling in the left lane in FIG. 4, the obstacle-containing direction $S_{out}$ is set as the left-hand direction.

Figure 6:
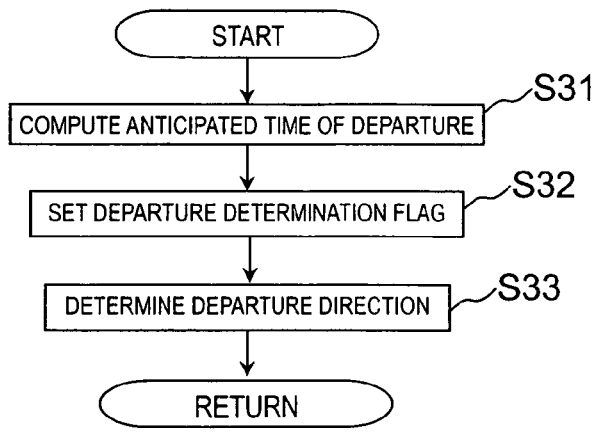
FIG. 6 is a flowchart showing the processing content for determining the lane departure tendency by the driving/braking force control unit.

In step S7, the lane departure determination flag $F_{out}$ is set based on the estimated time of departure $T_{out}$, and the lane departure direction $D_{out}$ is determined based on the lateral displacement X (see FIG. 6).

Furthermore, the driver's intention to change lanes is determined based on the lane departure direction $D_{out}$ obtained in this manner and on the direction (lighted blinker side) indicated by the turn switch signal (step S8).

For example, when the direction (lighted blinker side) indicated by the turn switch signal and the direction indicated by the lane departure direction $D_{out}$ are the same, it is determined that the driver is intentionally changing lanes. In this case, the lane departure determination flag $F_{out}$ is changed to OFF.

When the direction (lighted blinker side) indicated by the turn switch signal and the direction indicated by the lane departure direction $D_{out}$ are different, the lane departure determination flag $F_{out}$ is kept unchanged in the case that it is ON. The reason is that when the direction (lighted blinker side) indicated by the turn switch signal and the direction indicated by the lane departure direction $D_{out}$ are different, the lane departure behavior of the host vehicle may be due to factors other than the driver's intention to change lanes or the like, so the condition of the lane departure determination flag $F_{out}$ is kept unchanged when the flag is ON.

The start of an alarm for departure avoidance, the presence or absence of the lane departure-avoiding braking control, and the method for carrying out departure-avoiding braking control are selected based on the lane departure determination flag $F_{out}$, the obstacle-containing direction $S_{out}$, and the lane departure direction $D_{out}$ (step S9).

Furthermore, the target yaw moment Ms is calculated based on the lateral displacement X and the variation amount dx (step S10), and departure-avoiding deceleration is also calculated (step S11).

The target brake hydraulic pressure Psi (i=fl, fr, rl, rr) applied to each wheel is calculated for carrying out the braking control method selected based on the lane departure determination flag $F_{out}$, the obstacle-containing direction $S_{out}$, and the lane departure direction $D_{out}$. The target brake hydraulic pressure Psi (i=fl, fr, rl, rr) is output to the brake hydraulic pressure control unit 7 as a brake hydraulic pressure command value (step S12). In the brake hydraulic pressure control unit 7, the brake hydraulic pressure is individually controlled for the wheel cylinders 6FL to 6RR based on the brake hydraulic pressure command value. Therefore, the configuration is such that when there is a lane departure tendency, a predetermined vehicle behavior is exhibited in accordance with the driving environment.

Figure 10:
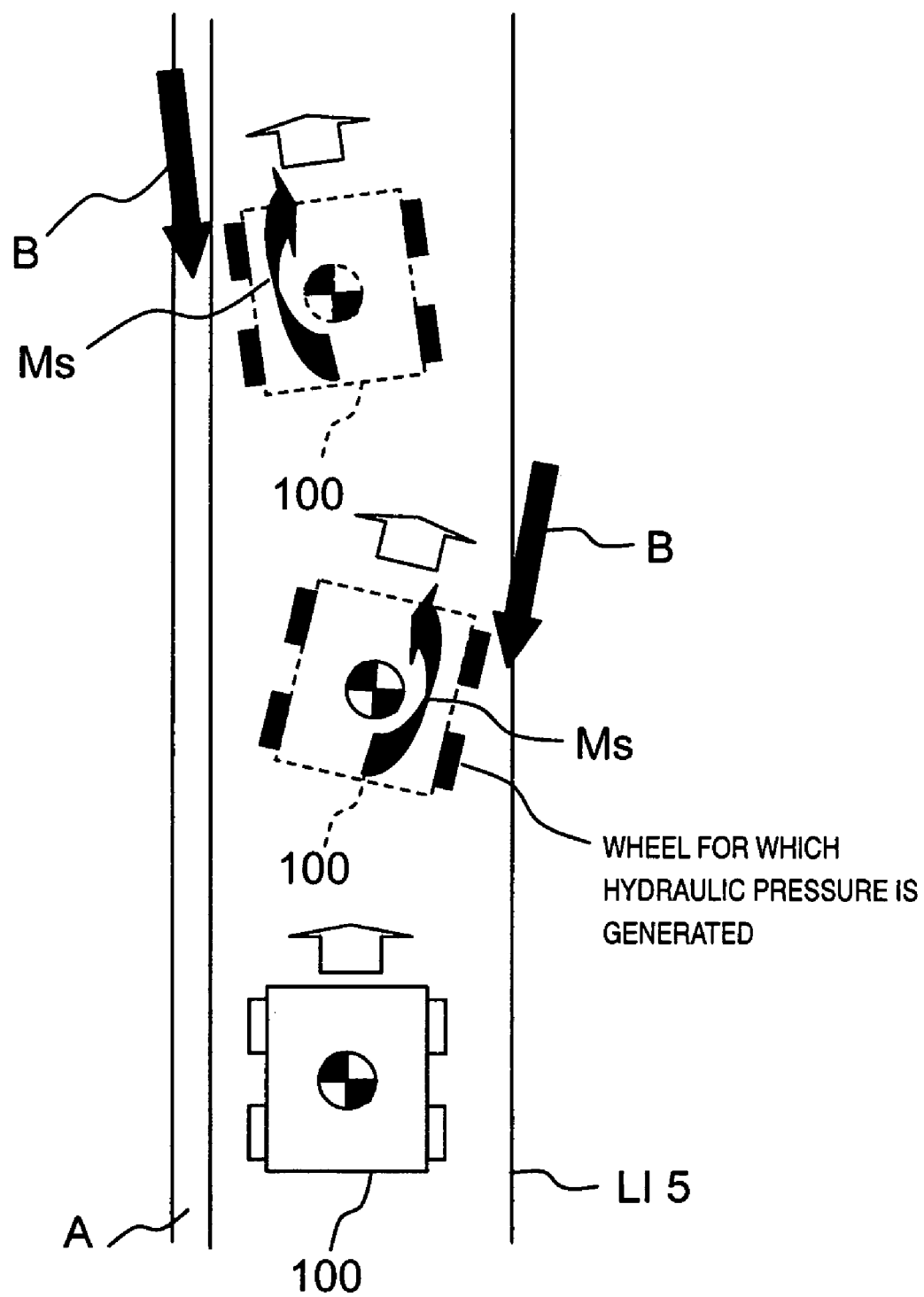
FIG. 10 is a diagram used for describing the braking control method in the second case.

Here, the manner in which the host vehicle behaves when braking control is carried out is described for the first to third scenarios or cases with reference to FIGS. 10 (second case) and 11 (first and third cases).

Figure 11:
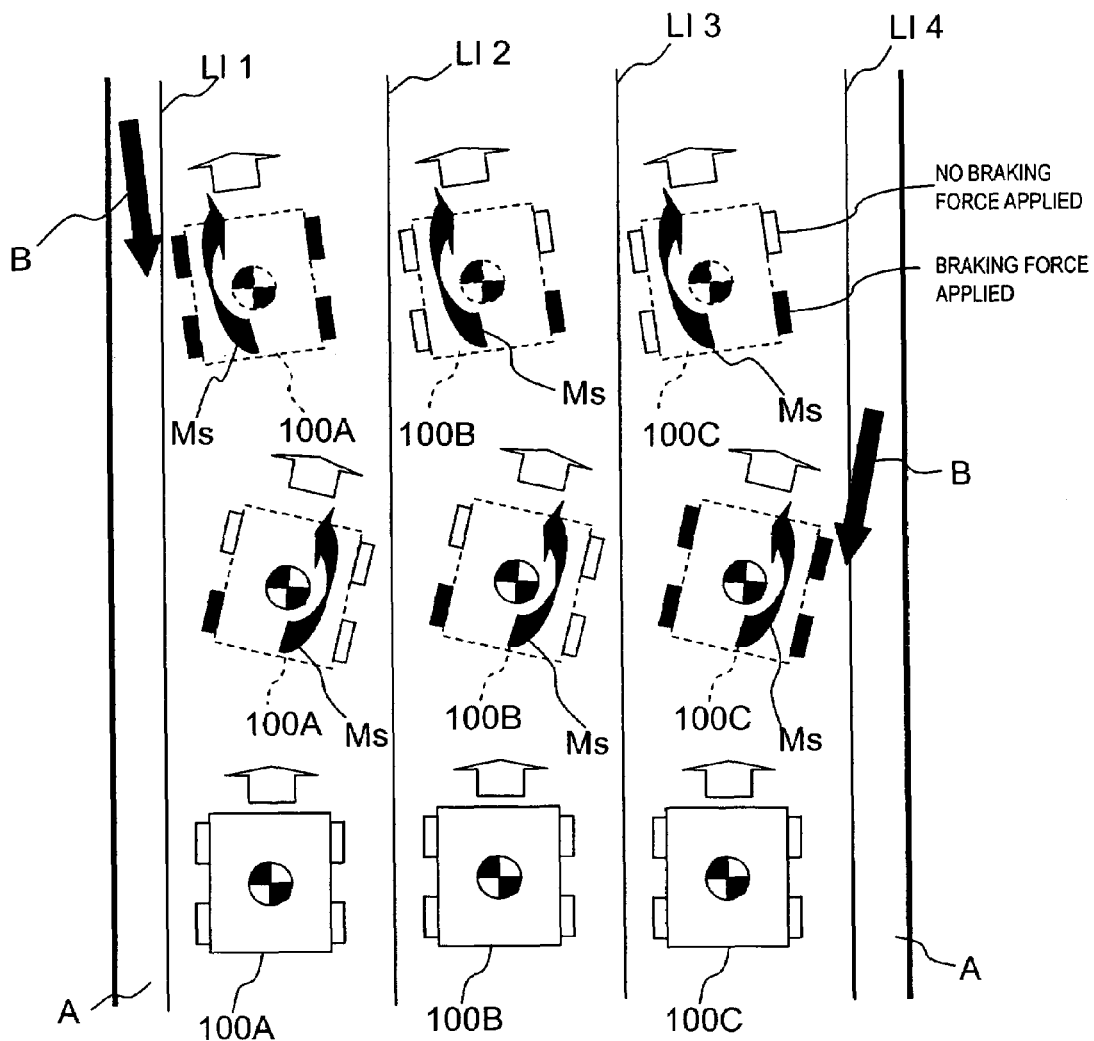
FIG. 11 is a diagram used for describing the braking control method in the third case.

The wheels colored in black in FIGS. 10 and 11 are those in which hydraulic pressure is generated and braking force is provided. In other words, when either one of the left and right wheels is a wheel colored in black, there is a difference in hydraulic pressure or braking force in the left and right wheels. This case shows a yaw moment imparted to the host vehicle. Also, when the left and right wheels are colored in black, there can still be a difference in the hydraulic pressure values thereof, in which case the host vehicle undergoes controlled deceleration while a yaw moment is simultaneously imparted to the host vehicle.

The second case, as described above, is one in which there is a match between the obstacle-containing direction $S_{out}$ and the lane departure direction $D_{out}$, and where the road type R is an ordinary road. In other words, when the host vehicle 100 is traveling on a two-lane, two-way road wherein the road shoulder A is to the left and the opposing lane (center lane LI 5 side) is to the right, there are cases in which the host vehicle 100 (the host vehicle 100 in the uppermost position of FIG. 10) may tend to depart in the left-hand direction, and cases in which the host vehicle (the host vehicle 100 in the center position of FIG. 10) may tend to depart in the right-hand direction, as shown in FIG. 10.

In this case, the lane departure-avoiding yaw control is carried out. Furthermore, when the estimated time of departure $T_{out}$ becomes less than the second departure-determining threshold Tr, the lane departure-avoiding yaw control is applied, and the lane departure-avoiding deceleration control is carried out. The host vehicle thereby avoids departure. The driver can feel the lane departure avoidance action as acceleration in the lateral direction or as deceleration in the direction of travel, and know that the host vehicle has a tendency to depart.

The third case, as described above, is one in which there is a match between the first obstacle-containing direction $S_{out}$ and the lane departure direction $D_{out}$ and where the road type R is an expressway. In other words, this is a case in which the host vehicle 100A (host vehicle 100A in the uppermost position of FIG. 11) traveling in the left-hand lane on a three-lane, one-way road has a tendency to depart in the left-hand direction, as shown in FIG. 11. An alternative case is one in which the host vehicle 100C (host vehicle 100C in the center position of FIG. 11) traveling in the right-hand lane on a three-lane, one-way road has a tendency to depart in the right-hand direction, as shown in FIG. 11.

In this case, departure-avoiding yaw control is carried out. The host vehicle can thereby avoid departure. Furthermore, when the estimated time of departure $T_{out}$ reaches 0, in other words, when it is determined that the host vehicle has departed from the driving lane, the lane departure-avoiding yaw control is applied, and the lane departure-avoiding deceleration control is carried out.

The first case, as described above, is one in which there is no match between the obstacle-containing direction $S_{out}$ and the lane departure direction $D_{out}$. In other words, there are cases in which the host vehicle 100A (host vehicle 100A in the center position of FIG. 11) traveling in the left-hand lane on a three-lane, one-way road has a tendency to depart in the right-hand direction, as shown in FIG. 11. There are also cases in which the host vehicle 100C (host vehicle 100C in the lowermost position of FIG. 11) traveling in the right-hand lane on a three-lane, one-way road has a tendency to depart in the left-hand direction, as shown in FIG. 11. There are furthermore cases in which the host vehicle 100B traveling in the center lane has a tendency to depart in the left-hand or right-hand direction. The lane departure-avoiding yaw control is carried out in this case. The host vehicle can thereby avoid departure.

Braking control for this type of departure avoidance is performed and an alarm is issued with a sound or display. The alarm is initiated with a predetermined timing in advance of braking control, or simultaneously with braking control, for example.

When, as described above, the system-operating switch 32 is OFF but the hazard switch 31 has been ON for a predetermined length of time $T_H$, the system advances to processing in a later step (processing in step S5 and thereafter). Hence, in this case, the system for departure avoidance is automatically set in an operable state or in an operating standby state, so when the host vehicle is about to depart, control for departure avoidance is performed based on the details of braking control described above.

The system for departure avoidance is thus set in an operable state and the time (hereinafter referred to as "operating time") $T_{F\_H}$ during which the system is in the operable state is kept constant. More specifically, the operating time $T_{F\_H}$ is set in accordance with the time that the hazard switch 31 is being operated.

Furthermore, when the system for departure avoidance is thus set in an operable state, a warning is sounded with the warning sound output unit 35, and braking control such as departure-avoiding yaw control or departure-avoiding deceleration control is thereafter performed when the host vehicle is tending toward departure from the driving lane. Moreover, the output timing of such a warning output is set earlier than in ordinary circumstances. More specifically, in the lane departure prevention apparatus, the warning output is carried out with predetermined timing when the host vehicle is tending toward departure, but the predetermined timing is advanced to an earlier timing than is used in ordinary circumstances.

With such a configuration, a warning begins to sound from the warning sound output unit 35 with earlier timing than in ordinary circumstances when the host vehicle is tending toward departing from the driving lane in the case that the system for departure avoidance is set in an operable state, and braking control such as departure-avoiding yaw control or departure-avoiding deceleration control operates thereafter with a certain timing.

The effects of this embodiment will now be described.

As described above, when the hazard switch 31 has been ON for a predetermined length of time $T_H$, the system for departure avoidance is automatically set in an operable state even when the system-operating switch 32 has been switched OFF by the driver. Control for departure avoidance is performed based on the braking control details in accordance therewith when the host vehicle is tending toward departure.

When the system for departure avoidance has been switched OFF by the system-operating switch 32, and the host vehicle is tending toward departure, the lane departure can be avoided by automatically setting the system for departure avoidance in an operable state, even when the condition of the driver is a condition in which the driver cannot perceive that the host vehicle is tending toward departure. In other words, assuming that the case in which the hazard switch 31 has been ON for a predetermined length of time $T_H$ is a case in which the driver is in a condition wherein he cannot perceive that the host vehicle is tending toward departure, when the host vehicle is tending toward departure under this assumption, the lane departure can be avoided by automatically setting the system for departure avoidance in an operable state.

When the driver has entered an expressway or the like that is congested, there are cases in which the driver switches ON the hazard switch 31 to inform trailing vehicles of the congested condition. In this case, the driver tends to focus his attention rearward. The possibility that the vehicle may depart from the driving lane is high is such a case. Based on this fact, even when the system-operating switch 32 has been switched OFF, the system for departure avoidance is automatically set in an operable state when the hazard switch 31 has been ON for a predetermined length of time $T_H$. When the system-operating switch 32 is OFF, the host vehicle can thereby be prevented from departing from the driving lane in congested traffic even when the attention of the driver is drawn rearward to inform the trailing vehicle of the congested situation.

As described above, the operating time $T_{F\_H}$ of the system when the system for departure avoidance has automatically been set in an operable state is set in accordance with the time the hazard switch 31 has been operated. The operating time of the system for departure avoidance can thereby be suitably set. For example, a case in which the driver may switch OFF the system-operating switch 32 is one in which the driver may feel annoyance at control for departure avoidance when departure-avoiding action can be performed by the driver himself. Based in this situation, the operating time $T_{F\_H}$ is preferably divided into set time periods, even when the system for departure avoidance is set in an operable state because the driver is in a condition in which he cannot perceive that the host vehicle is tending toward departure. Therefore, the system for departure avoidance can be suitably set in an operable state by setting the operating time $T_{F\_H}$ in accordance with the length of time the hazard switch 31 has been operated.

As described above, when the system for departure avoidance is automatically set in an operable state, a warning is sounded with the warning sound output unit 35, and braking control such as departure-avoiding yaw control and departure-avoiding deceleration control is thereafter performed when the host vehicle is tending toward departure from the driving lane. The driver who is in a state in which he cannot perceive that the host vehicle is tending toward departure can thereby be informed that the system for departure avoidance has been automatically set in an operable state, and furthermore, that the system has detected that the host vehicle is tending toward departure from the driving lane.

As described above, the output timing of such a warning sound is carried out earlier than in ordinary circumstances. The driver who is in a state in which he cannot perceive that the host vehicle is tending toward departure can be informed at an early stage that the host vehicle is tending toward departure.

Second Embodiment

Figure 12:
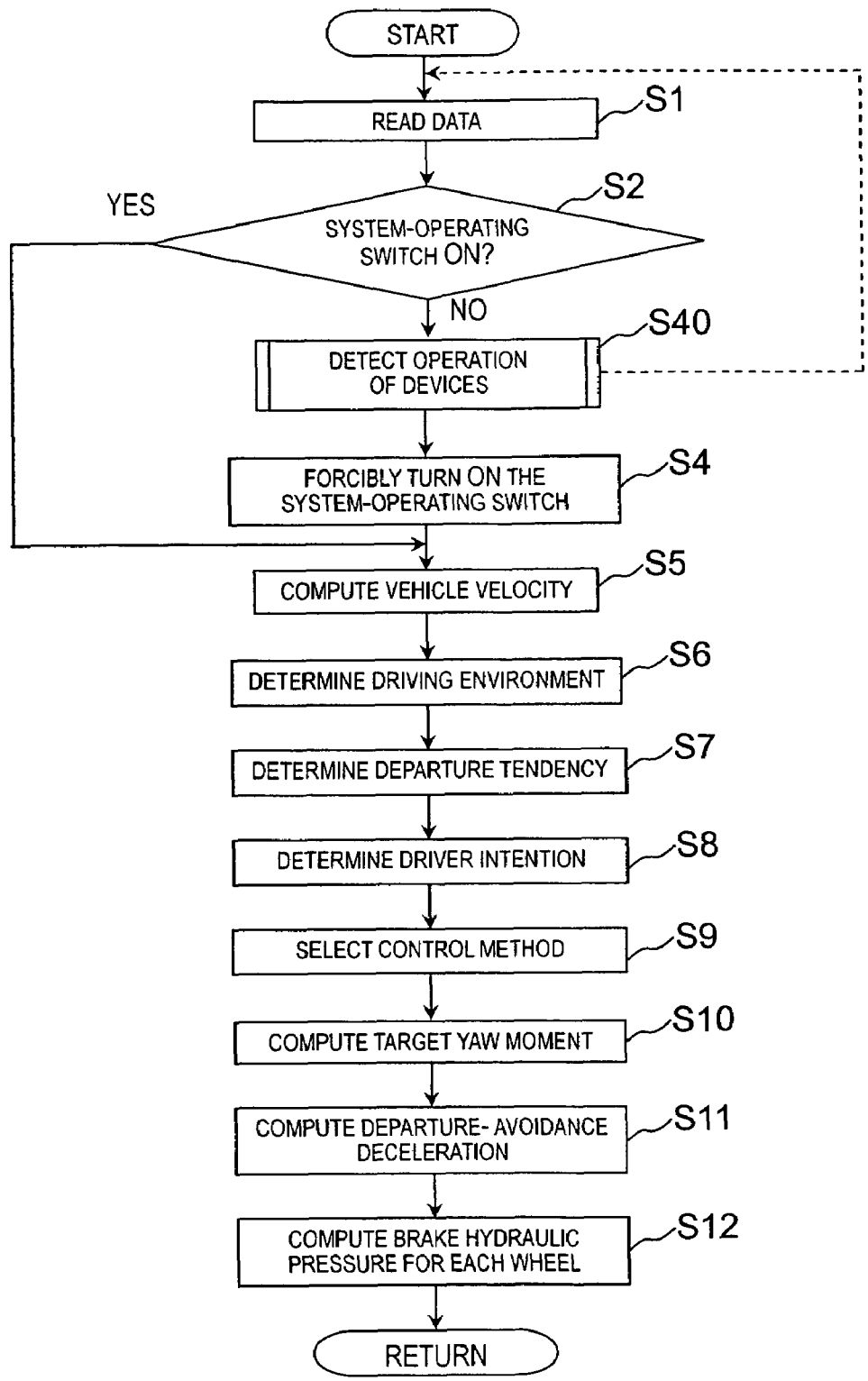
FIG. 12 is a flowchart showing the processing content of a driving/braking force control unit as a component of the lane departure prevention apparatus in accordance with a second embodiment of the present invention.
Figure 13:
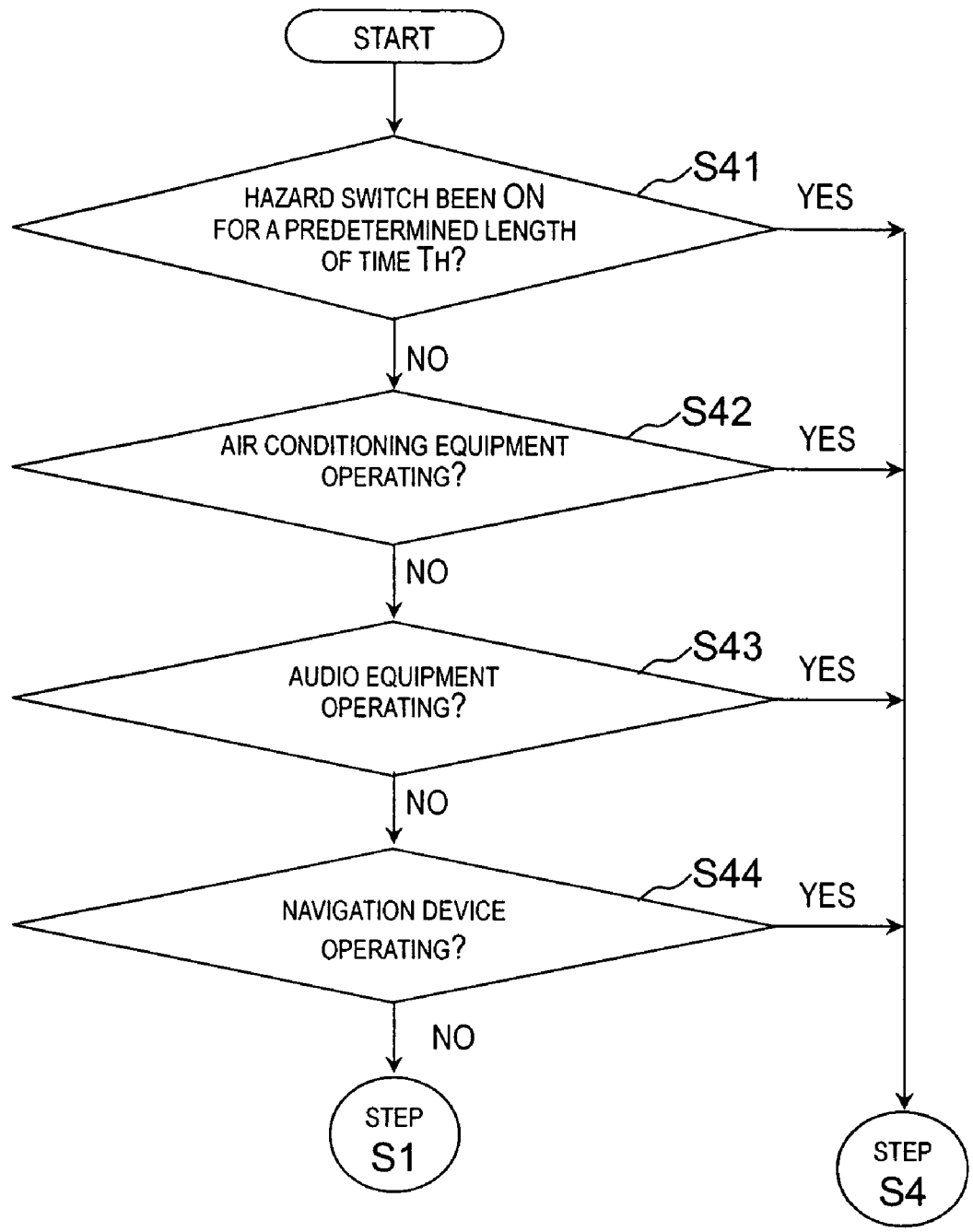
FIG. 13 is a flowchart showing the processing content of the apparatus operation detection during the processing of the driving/braking force control unit in accordance with the second embodiment of the present invention.

Referring now to FIGS. 12 and 13, a pair of flowcharts are illustrated that uses alternate processing for the vehicle departure prevention apparatus of FIG. 1 in accordance with a second embodiment. In particular, FIG. 12 shows the processing content of a driving/braking force control unit as a component of the lane departure prevention apparatus of FIG. 1 in accordance with a second embodiment of the present invention. FIG. 13 shows the processing content of the apparatus operation detection during the processing of the driving/braking force control unit in accordance with the second embodiment of the present invention.

In view of the similarity between the first and second embodiments, the parts and/or processing used in the second embodiment that are identical to the parts and/or processing of the first embodiment will be given the same reference numerals as the parts and/or processing of the first embodiment. Moreover, the descriptions of the parts of the second embodiment that are identical to the parts and/or processing of the first embodiment may be omitted for the sake of brevity.

In the first embodiment described above, the system for departure avoidance is automatically set in an operable state on the basis of the ON operation of the hazard switch 31, but in the second embodiment the operating state of other devices and the like is also taken into consideration to automatically set the system for departure avoidance in an operable state. More specifically, the operating state of the navigation device 15, the air conditioning equipment 33, and the audio equipment 34 provided to the vehicle as shown in FIG. 1 are taken into consideration, and the system for departure control is automatically set in an operable state.

In the same manner as in the first embodiment, the driving/braking force control unit 8 performs processing for avoiding departure with consideration for the state of any of these devices being operated by the driver. Switches for detecting the operating state of the devices are provided, for example, and the driving/braking force control unit 8 detects the operating state of the devices on the basis of the states of the switches. FIGS. 12 and 13 show the specific processing procedures.

The processing procedures are substantially the same as the processing procedures (FIG. 2) of the first embodiment.

In other words, various data is read in step S1 shown in FIG. 12. In this case, the driving/braking force control unit 8 reads the state (operating signal) of the navigation device 15, the air conditioning equipment 33, and the audio equipment 34 being operated by the driver. For example, the operating states of these devices are read based on the state of the switches, as described above.

In the subsequent step S2, a determination is made as to whether the system-operating switch 32 is ON. If the system-operating switch 32 is ON, the system advances to step S5, and if the system-operating switch 32 is OFF, the system advances to step S40.

In step S40, in addition to the operating state of the hazard switch 31, the operating states of the navigation device 15, the air conditioning equipment 33, and the audio equipment 34 are also detected. FIG. 13 shows the detection processing procedure.

First, in step S41, a determination is made as to whether the hazard switch 31 has been ON for predetermined length of time $T_H$. In this case, if the hazard switch 31 has been ON for predetermined length of time $T_H$, the system advances to step S4 shown in FIG. 12, and if the hazard switch 31 has not been ON for predetermined length of time $T_H$, the system advances to step S42.

In step S42, a determination is made as to whether the air conditioning equipment 33 is being operated by the driver. In this case, if the driver is operating the air conditioning equipment 33, the system advances to step S4 shown in FIG. 12, and if the driver is not operating the air conditioning equipment 33, the system advances to step S43.

In step S43, a determination is made as to whether the audio equipment 34 is being operated by the driver. In this case, if the driver is operating the audio equipment 34, the system advances to step S4 shown in FIG. 12, and if the driver is not operating the audio equipment 34, the system advances to step S44.

In step S44, a determination is made as to whether the navigation device 15 is being operated by the driver. In this case, if the driver is operating the navigation device 15, the system advances to step S4 shown in FIG. 12, and if the driver is not operating the navigation device 15, processing is performed again from step S1.

In step S4 shown in FIG. 12, the system-operating switch 32 is forcibly switched ON. The system then advances to step S5 in the same manner as in the first embodiment.

The processing performed in the subsequent steps S5 to S12 include calculation of the vehicle velocity, determination of the driving environment, determination of the lane departure tendency, determination of the driver intention, selection of the braking method, calculation of the target yaw moment, calculation of the lane departure-avoiding deceleration, and calculation of the target brake hydraulic pressure for each wheel in the same manner as in the first embodiment. The target brake hydraulic pressure Psi (i=fl, fr, rl, rr) for each wheel is output to the brake hydraulic pressure control unit 7 as a brake hydraulic pressure command value.

The system for departure avoidance is automatically set in an operable state by processing such as that described above when the hazard switch 31 has been operated for a length of time equivalent to a predetermined amount of time $T_H$ even when the system-operating switch 32 is OFF. Also, when the driver has been operating the air conditioning equipment 33 for a predetermined length of time $T_{AC}$, the system for departure avoidance is automatically set in an operable state even if the system-operating switch 32 is OFF. Furthermore, when the driver has been operating the audio equipment 34 for a predetermined length of time $T_{aud}$, the system for departure avoidance is automatically set in an operable state even if the system-operating switch 32 is OFF. Moreover, when the driver has been operating the navigation device 15 for a predetermined length of time $T_{nav}$, the system for departure avoidance is automatically set in an operable state even if the system-operating switch 32 is OFF.

Thus, control for departure avoidance operates based on the braking control details when the host vehicle is tending toward departure by automatically setting the system for departure avoidance in an operable state.

Here, the system for departure avoidance is automatically set in an operable state in this manner on the basis of the operating states of the switches and devices, and the operating times thereof are set to fixed lengths of time. More specifically, the operating times are set in accordance with the operated switches and devices. Here, the operating time when the hazard switch 31 is ON is defined as $T_{F\_H}$, the operating time when the air conditioning equipment 33 is operated is defined as $T_{F\_ac}$, the operating time when the audio equipment 34 is operated is defined as $T_{F\_aud}$, the operating time when the navigation device 15 is operated is defined as $T_{F\_nav}$, and the relationship between these operating times is given in the following relationship.

$$T_{F\_nav} > T_{F\_aud} > T_{F\_ac} = T_{F\_H}$$

The operating time is commonly greater in the following order: the operating time of the hazard switch 31 and the operating time of the air conditioning equipment 32, the operating time of the audio equipment 34, and the operating time of the navigation device 15. In other words, the operating time it extended with an increase in the time required for operation.

The value of the time that the hazard switch 31 has been ON can be used unchanged as the operating time, or the value of the time that the devices have been operating can be used unchanged as the operating time. Alternately, the operating time may be set longer with respect to the ON time or the operating time.

Following is a description of the effects of the second embodiment.

As described above, the system for departure avoidance can be suitably set in an operable state in accordance with the condition of the driver when the driver cannot perceive that the host vehicle is tending toward departure, by setting the operating time in correspondence with the respective operating times of the switches and devices.

The embodiments of the present invention have been described above. However, the present invention is not limited to being realized in the above-described embodiments. In other words, a detailed description was given in the above embodiments concerning the methods of combining braking control (departure-avoiding yaw control) so that a yaw moment for avoiding departure is imparted to the host vehicle, and deceleration control (departure-avoiding deceleration control) for decelerating to avoid departure; the operating order of these methods; and the control amounts used in these methods (magnitude of the yaw moment, and magnitude of the deceleration). However, it is apparent that the present invention is not limited thereby. In other words, when the host vehicle is tending toward departure from the driving lane, for example, the present invention may be applied as long as the object of application is a lane departure prevention apparatus that prevents the host vehicle from departing by brake control.

The case in which the driver is in a condition in which he cannot perceive that the host vehicle is tending toward departure was described in the embodiments described above on the basis of the operating condition of the hazard switch 31 and various devices. However, it is apparent that the present invention is not limited thereby. For example, the posture, actions, or the consciousness state of the driver in the car, or the field of vision of the driver may be detected, and, based on the detection results, it may be determined that the condition of the driver is a condition in which the driver cannot perceive that the host vehicle is tending toward departure.

Described in the embodiments above is the case in which a warning is sounded from the warning sound output unit 35, and braking control such as departure-avoiding yaw control and departure-avoiding deceleration control are thereafter performed in the case that the system for departure avoidance is set in an operable state and the host vehicle is tending toward departure from the driving lane. However, the action may be limited to the sounding of a warning from the warning sound output unit 35 in the case that the system for departure avoidance is set in an operable state and the host vehicle is tending toward departure from the driving lane. In this case, for example, the target brake hydraulic pressure Psi (i=fl, fr, rl, rr) for each wheel is a value in which the master cylinder hydraulic pressure Pmf or Pmr alone has been taken into consideration.

In the above-described embodiment, the case was described in which a warning was sounded mainly from the warning sound output unit 35 as an example of a warning output. However, it is apparent that the present invention is not limited thereby. In other words, the warning output may be a warning display or any other device that can draw the attention of the driver.

Also, the estimated time to departure $T_{out}$ was calculated (refer to Equation (2)) in the above-described embodiments based on the lateral displacement X and the variation dx thereof. However, the estimated time to departure $T_{out}$ can also be obtained by another method. For example, the estimated time to departure $T_{out}$ may also be obtained based on the yaw angle $\phi$, yaw rate $\phi'$, or steering angle $\delta$.

Also, in the embodiments described above, the intention of the driver to change lanes is obtained based on the steering angle $\delta$ and the variation of the steering angle (refer to step S8). However, the intention of the driver to change lanes can also be obtained by another method. For example, the intention of the driver to change lanes can be obtained based on the steering torque.

Also, the target yaw moment Ms was calculated (refer to Equation (3)) in the above-described embodiments based on lateral displacement X and the variation dx. However, the target yaw moment Ms can also be obtained by another method. For example, the target yaw moment Ms can also be obtained based on the yaw angle $\phi$, lateral displacement X, and driving lane curvature $\beta$, as shown in Equation (17) below.

$$Ms = K3 \cdot \phi + K4 \cdot X + K5 \cdot \beta \tag{13}$$

Here, terms K3, K4, and K5 are gains that vary with velocity V.

Also, the target brake hydraulic pressure Pgf for the front wheels in the above embodiments was described with the aid of a specific equation (refer to Equation (4)). However, the present invention is not limited thereby. The target brake hydraulic pressure Pgf for the front wheels can also be calculated with Equation (14) below.

$$Pgf = Kgv \cdot V + Kg\phi \cdot \phi + Kg\beta \cdot \beta \tag{14}$$

Here, terms Kg$\phi$ and Kg$\beta$ are, respectively, conversion factors that are used for converting braking force to brake hydraulic pressure and are set based on the yaw angle $\phi$ and driving lane curvature $\beta$.

The target hydraulic pressure differences $\Delta Psf$ and $\Delta Psr$ for the front and rear wheels are calculated in order to realize departure-avoiding yaw control in the embodiments described above (refer to Equations (7) and (8)). However, the present invention is not limited thereby. For example, the lane departure-avoiding yaw control can be realized solely with front wheel target hydraulic pressure difference $\Delta Psf$. In this case, the front wheel target hydraulic pressure difference $\Delta Psf$ is calculated with Equation (15) below.

$$\Delta Psf = 2 \cdot Kbf \cdot Ms/T \tag{15}$$

In the description of the embodiments described above, the system-operating switch 32 is an embodiment of the lane departure avoidance activation section or device for the driver to instruct the operation of control braking for avoiding the lane departure. The processing routine of step S3 of the driving/braking force control unit 8 is an embodiment of the driver condition detection section or device for detecting that the condition of the driver is a condition in which the driver cannot perceive that the host vehicle is tending toward departure. The processing routine of steps S2 to S4 of the driving/braking force control unit 8 is an embodiment of the lane departure avoidance control device for setting the braking control for avoiding departure in an operable state when the braking control for avoiding the lane departure with the lane departure avoidance activation section or device is in a non-operating state, and the driver condition detection section or detects that the condition of the driver is a condition in which the driver cannot perceive that the host vehicle is tending toward departure.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-369448. The entire disclosure of Japanese Patent Application No. 2003-369448 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lane departure prevention apparatus comprising:
a system operating-switch to selectively turn the lane departure prevention apparatus between an OFF position corresponding to a non-operating state, in which lane departure avoidance of a host vehicle will not be performed even though the host vehicle is departing from a driving lane, and an ON position corresponding to an operable state in which lane departure avoidance is performed by a braking control operation for avoiding lane departure of the host vehicle from the driving lane when the host vehicle is tending to depart from the driving lane, based on a driver's selection of the system operating-switch;
a driver condition detection section configured to detect that a driver condition tending to indicate a driver may not perceive that the host vehicle is tending toward lane departure; and
a lane departure avoidance control section configured to forcibly switch from the non-operating state to the operable state, when the non-operating state is selected by the system operating-switch being in the OFF position and when the driver condition detection section detects that the driver condition is tending to indicate that the driver may not perceive that the host vehicle is tending toward lane departure.

2. The lane departure prevention apparatus according to claim 1, further comprising:
a warning output section configured to output a warning prior to performing lane departure avoidance braking for avoiding lane departure when the host vehicle is tending toward lane departure from the driving lane and when the braking control operation for avoiding departure has been set in the operable state.

3. The lane departure prevention apparatus according to claim 2, wherein
the warning output section is configured to output the warning with a predetermined timing when the host vehicle is tending toward departure from the driving lane, and to advance the predetermined timing when the braking control operation for avoiding lane departure has been set in the operable state in comparison to when the braking control operation for avoiding lane departure has been set in the non-operating state.

4. The lane departure prevention apparatus according to claim 3, wherein
the driver condition detection section is further configured to detect that the driver condition is tending to indicate that the driver may not perceive that the host vehicle is tending toward lane departure when the driver is operating a vehicle device that is not related to driving operations.

5. The lane departure prevention apparatus according to claim 2, wherein
the driver condition detection section is further configured to detect that the driver condition is tending to indicate that the driver may not perceive that the host vehicle is tending toward lane departure when the driver is operating a vehicle device that is not related to driving operations.

6. The lane departure prevention apparatus according to claim 1, wherein
the driver condition detection section is further configured to detect that the driver condition is tending to indicate that the driver may not perceive that the host vehicle is tending toward lane departure when the driver is operating a vehicle device that is not related to driving operations.

7. The lane departure prevention apparatus according to claim 6, wherein
the lane departure avoidance control section is further configured so as to determine a time for switching the braking control operation to the operable state based on an amount of time that the driver is operating the vehicle device that is not related to the driving operations of the host vehicle.

8. The lane departure prevention apparatus according to claim 7, wherein
the lane departure avoidance control section is further configured so as to adjust the time for switching the braking control operation to the operable state is lengthened as the operating time of the vehicle device becomes longer.

9. The lane departure prevention apparatus according to claim 6, wherein
the driver condition detection section is configured to detect operating a hazard switch as the driver condition in which the driver cannot perceive that the host vehicle is tending toward lane departure.

10. The lane departure prevention apparatus according to claim 6, wherein
the driver condition detection section is configured to detect operating audio equipment as the driver condition in which the driver cannot perceive that the host vehicle is tending toward lane departure.

11. The lane departure prevention apparatus according to claim 4, wherein
the driver condition detection section is configured to detect operating air conditioning equipment as the driver condition in which the driver cannot perceive that the host vehicle is tending toward lane departure.

12. The lane departure prevention apparatus according to claim 6, wherein
the driver condition detection section is configured to detect operating a navigation device as the driver condition in which the driver cannot perceive that the host vehicle is tending toward lane departure.

13. A lane departure prevention apparatus comprising:
lane departure avoidance control activation means for selectively turning the lane departure prevention apparatus between an OFF position corresponding to non-operating state, in which lane departure avoidance of a host vehicle will not be performed even though the host vehicle is departing from a driving lane, and an ON position corresponding to an operable state in which departure avoidance is performed by an automatic vehicle control operation for avoiding lane departure of the host vehicle from the driving lane when the host vehicle is tending to depart from the driving lane, based on a driver's selection of the lane departure avoidance control activation means;
driver condition detection means for detecting that a driver condition tending to indicate a driver may not perceive that the host vehicle is tending toward lane departure; and
lane departure avoidance control means for forcibly switching from the non-operating state to the operable state, when the non-operating state is selected by the lane departure avoidance control activation means being in the OFF position and when the driver condition detection means detects that the driver condition is tending to indicate that the driver may not perceive that the host vehicle is tending toward lane departure.

14. A lane departure prevention apparatus comprising:
a system operating-switch to selectively turn the lane departure prevention apparatus between an OFF position corresponding to a non-operating state and an ON position corresponding to an operable state of an automatic vehicle control operation for avoiding lane departure of a host vehicle from a driving lane when the host vehicle is tending to depart from the driving lane based on a driver's selection of the system operating-switch, in which the automatic vehicle control operation is not performed when the non-operating state is selected by the system operating-switch being in the OFF position even though the host vehicle is tending to depart from the driving lane;
a driver condition detection section configured to detect that a driver condition tending to indicate a driver may not perceive that the host vehicle is tending toward lane departure; and
a lane departure avoidance control section configured to forcibly switch from the non-operating state to the operable state, when the non-operating state is selected by the system operating-switch being in the OFF position and when the driver condition detection section detects that the driver condition is tending to indicate that the driver may not perceive that the host vehicle is tending toward lane departure.

15. The lane departure prevention apparatus according to claim 14, further comprising:
a warning output section configured to output a warning prior to performing the automatic vehicle control operation for avoiding lane departure when the host vehicle is tending toward lane departure from the driving lane and when the automatic vehicle control operation for avoiding departure has been set in the operable state.

16. The lane departure prevention apparatus according to claim 15, wherein
the warning output section is configured to output the warning with a predetermined timing when the host vehicle is tending toward departure from the driving lane, and to advance the predetermined timing when the automatic vehicle control operation for avoiding lane departure has been set in the operable state in comparison to when the automatic vehicle control operation for avoiding lane departure has been set in the non-operating state.

17. The lane departure prevention apparatus according to claim 14, wherein
the driver condition detection section is further configured to detect that the driver condition is tending to indicate that the driver may not perceive that the host vehicle is tending toward lane departure when the driver is operating a vehicle device that is not related to driving operations.

18. The lane departure prevention apparatus according to claim 17, wherein
the lane departure avoidance control section is further configured so as to determine a time for switching the automatic vehicle control operation to the operable state based on an amount of time that the driver is operating the vehicle device that is not related to the driving operations of the host vehicle.

19. The lane departure prevention apparatus according to claim 18, wherein
the lane departure avoidance control section is further configured so as to adjust the time for switching the automatic vehicle control operation to the operable state is lengthened as the operating time of the vehicle device becomes longer.

* * * * *